United States Patent
Hayashi

(10) Patent No.: US 6,903,603 B2
(45) Date of Patent: Jun. 7, 2005

(54) PHASE DETECTION CIRCUIT AND RECEIVER

(75) Inventor: Ryoji Hayashi, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 48 days.

(21) Appl. No.: 10/467,061

(22) PCT Filed: Feb. 14, 2002

(86) PCT No.: PCT/JP02/01244

§ 371 (c)(1),
(2), (4) Date: Aug. 19, 2003

(87) PCT Pub. No.: WO02/067522

PCT Pub. Date: Aug. 29, 2002

(65) Prior Publication Data

US 2004/0092240 A1 May 13, 2004

(30) Foreign Application Priority Data

Feb. 19, 2001 (JP) ........................................ 2001-042474
Jul. 3, 2001 (JP) ........................................ 2001-202664

(51) Int. Cl.⁷ ................................................ H04B 1/16
(52) U.S. Cl. ..................... 329/313; 329/306; 329/343; 455/205; 455/209; 455/214
(58) Field of Search .............................. 329/313, 306, 329/343; 455/205, 209, 214

(56) References Cited

U.S. PATENT DOCUMENTS 5,517,689 A * 5/1996 Hayashihara ................ 455/205
6,775,530 B2 * 8/2004 Severson et al. ........... 455/324

FOREIGN PATENT DOCUMENTS

JP 6-77737 3/1994
JP 8-97875 4/1996

OTHER PUBLICATIONS

Mikio Hayashibara et al.: "Delta Sigma hencho gijutsu o mochiita iso kensyutsu hosiki to FM fukuchoki heno oyo" Shunki Convention Record, the Institute of Electronics, Information and Communication, "2 Tsushin Electronics", vol. 1994, pp. 2–368, Mar. 1994(With English Translation).
Ryoji Hayashi et al.: "Delta Sigma gata iso kenshutsuki niyoru PSK/FSK singo no jushin tokusei" National Convention Record, the Institute of Electronics, Information and Communication, "Tsushin 1", vol. 2001, p. 569, Mar. 2001(With English Translation).
Ryoji Hayashi et al. "Delta Sigma iso kenshutsuki niyoru PSK/FSK singo no jusin tokusel" Gijutsu Kenkyu Hokoku RCS 2001–203–224, the Institute of Electronics, Information and Communication, vol. 101, No. 544, pp. 151–158, Jan. 2002, (With English Abstract).
Akira Yukawa: "Over–sampling A–D conversion technique" Nikkei Business Publications, Inc., 3.2.2,3.3.2–3.3.3 Dec. 25, 1990 (with English translation).

* cited by examiner

Primary Examiner—Michael B. Shingleton
(74) Attorney, Agent, or Firm—Oblon, Spivak, McClelland, Maier & Neustadt, P.C.

(57) ABSTRACT

A quadrant deciding section decides the quadrant to which a received signal belongs based on a baseband signal. A rotation projector rotates the received signal and projects the rotated signal to a straight line that intersects orthogonally at the origin with a straight line that bisects the decided quadrant. An integrator integrates the signal after the projection. A one-bit quantizer quantizes the integration result by deciding the sign of the integration result. A delay circuit delays the quantized signal by a predetermined time. An adder adds the decision result and the quantized signal modulo the phase $2\pi$. A low-pass filter sequentially latches phase values after the addition with internal shift registers, converts the phase value to a prescribed specific value when the phase values that cross over $2\pi$ exist in the whole data within the registers, and averages the phase values.

20 Claims, 34 Drawing Sheets

FIG.9

| QUADRANT TO WHICH THE RECEIVED SIGNAL BELONGS | OUTPUT FROM THE QUADRANT DECIDING SECTION | OUTPUT FROM THE ONE-BIT QUANTIZER | | OUTPUT FROM THE ROTATION PROJECTOR | |
|---|---|---|---|---|---|
| | | INTEGRATION OUTPUT IS NEGATIVE | INTEGRATION OUTPUT IS POSITIVE | DELAY OUTPUT IS 0 | DELAY OUTPUT IS 1 |
| FIRST QUADRANT | 0 | 1 | 0 | −Q | I |
| SECOND QUADRANT | 1 | 1 | 0 | I | Q |
| THIRD QUADRANT | 2 | 1 | 0 | Q | −I |
| FOURTH QUADRANT | 3 | 1 | 0 | −I | −Q |

FIG.10

| QUADRANT TO WHICH THE RECEIVED SIGNAL BELONGS | OUTPUT FROM THE QUADRANT DECIDING SECTION | OUTPUT FROM THE ONE-BIT QUANTIZER | | OUTPUT FROM THE ROTATION PROJECTOR | |
|---|---|---|---|---|---|
| | | INTEGRATION OUTPUT IS NEGATIVE | INTEGRATION OUTPUT IS POSITIVE | DELAY OUTPUT IS 0 | DELAY OUTPUT IS 1 |
| FIRST QUADRANT | 0 | 0 | 1 | Q | -I |
| SECOND QUADRANT | 1 | 1 | 0 | -I | Q |
| THIRD QUADRANT | 2 | 0 | 1 | -Q | I |
| FOURTH QUADRANT | 3 | 1 | 0 | -I | -Q |

FIG.11

| QUADRANT TO WHICH THE RECEIVED SIGNAL BELONGS | OUTPUT FROM THE QUADRANT DECIDING SECTION | OUTPUT FROM THE ONE-BIT QUANTIZER | | OUTPUT FROM THE ROTATION PROJECTOR | |
|---|---|---|---|---|---|
| | | INTEGRATION OUTPUT IS NEGATIVE | INTEGRATION OUTPUT IS POSITIVE | DELAY OUTPUT IS 0 | DELAY OUTPUT IS 1 |
| FIRST QUADRANT | 0 | 1 | 0 | −Q | I |
| SECOND QUADRANT | 1 | 0 | 1 | −I | −Q |
| THIRD QUADRANT | 2 | 1 | 0 | Q | −I |
| FOURTH QUADRANT | 3 | 0 | 1 | I | Q |

FIG.15

| DOMAIN | PHASE | SIGN OF I | SIGN OF Q | SIZE OF I AND Q |
|---|---|---|---|---|
| FIRST DOMAIN | $0 \leq \theta < \pi/4$ | $I > 0$ | $Q \geq 0$ | $I > Q$ |
| SECOND DOMAIN | $\pi/4 \leq \theta < \pi/2$ | $I > 0$ | $Q \geq 0$ | $I \leq Q$ |
| THIRD DOMAIN | $\pi/2 \leq \theta < 3\pi/4$ | $I \leq 0$ | $Q > 0$ | $-I < Q$ |
| FOURTH DOMAIN | $3\pi/4 \leq \theta < \pi$ | $I \leq 0$ | $Q > 0$ | $-I \geq Q$ |
| FIFTH DOMAIN | $\pi \leq \theta < 5\pi/4$ | $I < 0$ | $Q \leq 0$ | $I < Q$ |
| SIXTH DOMAIN | $5\pi/4 \leq \theta < 3\pi/2$ | $I < 0$ | $Q \leq 0$ | $I \geq Q$ |
| SEVENTH DOMAIN | $3\pi/2 \leq \theta < 7\pi/4$ | $I \geq 0$ | $Q < 0$ | $I < -Q$ |
| EIGHTH DOMAIN | $7\pi/4 \leq \theta < 2\pi$ | $I \geq 0$ | $Q < 0$ | $I \geq -Q$ |

FIG.16

| DOMAIN TO WHICH THE RECEIVED SIGNAL BELONGS | OUTPUT FROM THE PHASE QUANTIZER | OUTPUT FROM THE ONE-BIT QUANTIZER | | OUTPUT FROM THE CONVERTING SELECTOR | |
|---|---|---|---|---|---|
| | | INTEGRATION OUTPUT IS NEGATIVE | INTEGRATION OUTPUT IS POSITIVE | DELAY OUTPUT IS 0 | DELAY OUTPUT IS 1 |
| FIRST DOMAIN | 0 | 0 | 1 | $Q$ | $-(I-Q)/\sqrt{2}$ |
| SECOND DOMAIN | 1 | 1 | 0 | $(I-Q)/\sqrt{2}$ | $-I$ |
| THIRD DOMAIN | 2 | 0 | 1 | $-I$ | $-(I+Q)/\sqrt{2}$ |
| FOURTH DOMAIN | 3 | 1 | 0 | $(I+Q)/\sqrt{2}$ | $Q$ |
| FIFTH DOMAIN | 4 | 0 | 1 | $-Q$ | $(I-Q)/\sqrt{2}$ |
| SIXTH DOMAIN | 5 | 1 | 0 | $-(I-Q)/\sqrt{2}$ | $-I$ |
| SEVENTH DOMAIN | 6 | 0 | 1 | $I$ | $(I+Q)/\sqrt{2}$ |
| EIGHTH DOMAIN | 7 | 1 | 0 | $-(I+Q)/\sqrt{2}$ | $-Q$ |

FIG.17

| DOMAIN TO WHICH THE RECEIVED SIGNAL BELONGS | OUTPUT FROM THE PHASE QUANTIZER | OUTPUT FROM THE ONE-BIT QUANTIZER | | OUTPUT FROM THE CONVERTING SELECTOR | |
|---|---|---|---|---|---|
| | | INTEGRATION OUTPUT IS NEGATIVE | INTEGRATION OUTPUT IS POSITIVE | DELAY OUTPUT IS 0 | DELAY OUTPUT IS 1 |
| FIRST DOMAIN | 0 | 1 | 0 | $-Q$ | $(I-Q)/\sqrt{2}$ |
| SECOND DOMAIN | 1 | 0 | 1 | $-(I-Q)/\sqrt{2}$ | $-I$ |
| THIRD DOMAIN | 2 | 1 | 0 | $I$ | $(I+Q)/\sqrt{2}$ |
| FOURTH DOMAIN | 3 | 0 | 1 | $-(I+Q)/\sqrt{2}$ | $-Q$ |
| FIFTH DOMAIN | 4 | 1 | 0 | $Q$ | $-(I-Q)/\sqrt{2}$ |
| SIXTH DOMAIN | 5 | 0 | 1 | $(I-Q)/\sqrt{2}$ | $I$ |
| SEVENTH DOMAIN | 6 | 1 | 0 | $-I$ | $-(I+Q)/\sqrt{2}$ |
| EIGHTH DOMAIN | 7 | 0 | 1 | $(I+Q)/\sqrt{2}$ | $Q$ |

FIG.18

| Domain to which the received signal belongs | Output from the phase quantizer | Output from the one-bit quantizer | | Output from the converting selector | |
|---|---|---|---|---|---|
| | | Integration output negative | Integration output positive | Delay output is 0 | Delay output is 1 |
| First domain | 0 | 0 | 1 | $Q$ | $-(I-Q)/\sqrt{2}$ |
| Second domain | 1 | 0 | 1 | $-(I-Q)/\sqrt{2}$ | $-I$ |
| Third domain | 2 | 0 | 1 | $-I$ | $-(I+Q)/\sqrt{2}$ |
| Fourth domain | 3 | 0 | 1 | $-(I+Q)/\sqrt{2}$ | $-Q$ |
| Fifth domain | 4 | 0 | 1 | $-Q$ | $(I-Q)/\sqrt{2}$ |
| Sixth domain | 5 | 0 | 1 | $(I-Q)/\sqrt{2}$ | $I$ |
| Seventh domain | 6 | 0 | 1 | $I$ | $(I+Q)/\sqrt{2}$ |
| Eighth domain | 7 | 0 | 1 | $(I+Q)/\sqrt{2}$ | $Q$ |

FIG.19

| DOMAIN TO WHICH THE RECEIVED SIGNAL BELONGS | OUTPUT FROM THE PHASE QUANTIZER | OUTPUT FROM THE ONE-BIT QUANTIZER | | OUTPUT FROM THE CONVERTING SELECTOR | |
|---|---|---|---|---|---|
| | | INTEGRATION OUTPUT IS NEGATIVE | INTEGRATION OUTPUT IS POSITIVE | DELAY OUTPUT IS 0 | DELAY OUTPUT IS 1 |
| FIRST DOMAIN | 0 | 1 | 0 | $-Q$ | $(I-Q)/\sqrt{2}$ |
| SECOND DOMAIN | 1 | 1 | 0 | $(I-Q)/\sqrt{2}$ | $I$ |
| THIRD DOMAIN | 2 | 1 | 0 | $I$ | $(I+Q)/\sqrt{2}$ |
| FOURTH DOMAIN | 3 | 1 | 0 | $(I+Q)/\sqrt{2}$ | $Q$ |
| FIFTH DOMAIN | 4 | 1 | 0 | $Q$ | $-(I-Q)/\sqrt{2}$ |
| SIXTH DOMAIN | 5 | 1 | 0 | $-(I-Q)/\sqrt{2}$ | $-I$ |
| SEVENTH DOMAIN | 6 | 1 | 0 | $-I$ | $-(I+Q)/\sqrt{2}$ |
| EIGHTH DOMAIN | 7 | 1 | 0 | $-(I+Q)/\sqrt{2}$ | $-Q$ |

FIG.32

| QUADRANT TO WHICH THE RECEIVED SIGNAL BELONGS | OUTPUT FROM THE QUADRANT DECIDING SECTION | OUTPUT FROM THE ONE-BIT QUANTIZER | | OUTPUT FROM THE ROTATION PROJECTOR | |
|---|---|---|---|---|---|
| | | INTEGRATION OUTPUT IS NEGATIVE | INTEGRATION OUTPUT IS POSITIVE | DELAY OUTPUT IS 0 | DELAY OUTPUT IS 1 |
| FIRST QUADRANT | 0 | 0 | 1 | Q | $-I$ |
| SECOND QUADRANT | 1 | 0 | 1 | $-I$ | $-Q$ |
| THIRD QUADRANT | 2 | 0 | 1 | $-Q$ | I |
| FOURTH QUADRANT | 3 | 0 | 1 | I | Q |

US 6,903,603 B2

PHASE DETECTION CIRCUIT AND RECEIVER

TECHNICAL FIELD

The present invention relates to a phase detecting circuit or a receiver that detects the phase of a frequency-modulated or phase-modulated received signal in the radio communications. The present invention relates, more particularly, to a phase detecting circuit or a receiver that detects the phase of a frequency shift keying (FSK) or phase shit keying (PSK) signal used in the digital mobile communications.

BACKGROUND ART

A conventional phase detecting circuit is explained below. FIG. 30 shows a structure of the conventional phase detecting circuit disclosed in Japanese Patent Application Laid-open No. 6-77737. The conventional phase detecting circuit detects a received signal from a base band signal. In FIG. 30, a reference numeral 101 denotes a quadrant deciding section, 102 denotes a rotation projector, 103 denotes an integrator, 104 denotes a one-bit quantizer, 105 denotes a delay device, 106 denotes an adder, and 107 denotes a low-pass filter. In the conventional example, the rotation projector 102, the integrator 103, the one-bit quantizer 104, the delay device 105, the adder 106, and the quadrant deciding section 101 constitute a delta sigma modulator.

The operation of the conventional phase detecting circuit is explained. The quadrant deciding section 101 decides the quadrant to which the received signal belongs based on a positive or negative sign of the in-phase component and the quadrature component of the received baseband signal, and outputs a coarse phase value corresponding to the result of the decision. When the quadrants of the received signals are in the first, the second, the third, and the fourth quadrants, the quadrant deciding section 101 outputs 0, 1, 2, and 3 respectively.

The rotation projector 102 rotates the reception complex base band signal by +π/4 or −π/4 corresponding to the data output from the delay device 105. The rotation projector 102 outputs a signed value of the rotated signal projected to a straight line that intersects orthogonally at the origin with a straight line that bisects the quadrant detected by the rotation projector 101.

The integrator 103 integrates the output from the rotation projector 102, and the one-bit quantizer 104 quantizes the integrated value. The one-bit quantizer 104 outputs 1 when the output from the integrator 103 is positive, and outputs 0 when this output is negative. The adder 106 adds this output value and the coarse phase value output from the quadrant deciding section 101. The delay device 105 delays the output from the one-bit quantizer 104 by one basic clock (i.e., one cycle) of the delta sigma modulator, and outputs the delayed signal to the rotation projector 102.

The low-pass filter 107 smoothes the quantization noise based on the phase data added. FIG. 31 shows a structure of the low-pass filter 107. In FIG. 31, a reference numeral 201 denotes shift registers, 202-1, 202-2, . . . , and 202-k denote multipliers, and 203 denotes an adder. In the low-pass filter 107, the shift registers 201 sequentially receive the inputs of phase data output from the adder 106. Each of the multipliers 202-1, . . . , and 202-k multiplies the contents of each register with a coefficient, and the adder 203 adds all the multiplied results. For example, when the coefficient is 1/k, a moving average of K sequential stages appears as the output from the adder 203.

The operation of the rotation projector 102 is explained. In the following explanation, the reception complex base band signal is explained as I+jQ. For example, when the output from the delay device 105 is 1, the rotation projector 102 rotates the received signal by −π/4, and it is possible to express the received signal as shown by the equation (1).

$$(I+jQ)(\cos(\pi/4)-j\sin(\pi/4))=((I+Q)+j(-I+Q))/\sqrt{2} \tag{1}$$

On the other hand, when the output from the delay device 105 is 0, the rotation projector 102 rotates the received signal by +π/4, and it is possible to express the received signal as shown by the equation (2).

$$(I+jQ)(\cos(\pi/4)+j\sin(\pi/4))=((I-Q)+j(I+Q))/\sqrt{2} \tag{2}$$

Next, the rotation projector 102 projects this signal to a straight line that intersects orthogonally at the origin with a straight line that bisects the quadrant detected by the quadrant deciding section 101. The direction of the straight line orthogonal with the bisector is determined such that the phase increasing direction in the quadrant detected by the quadrant deciding section 101 coincides with the positive direction of the straight line.

For example, when the received signal is in the first quadrant, the unit direction vector of the straight line that intersects orthogonally at the origin with the straight line that bisects the first quadrant becomes (−1/√2, 1/√2), when the second quadrant side is determined as positive. The projection of the rotated received signal to this straight line is expressed as the inner product of the vector with the unit direction vector of the straight line. Therefore, when the output from the delay device 105 is 1, it is possible to express the projection as shown by the equation (3), and when the output from the delay device 105 is 0, it is possible to express the projection as shown by the equation (4).

$$((I+Q)/\sqrt{2},(-I+Q)/\sqrt{2})\cdot(-1/\sqrt{2},1/\sqrt{2})=-I \tag{3}$$

$$((I-Q)/\sqrt{2},(I+Q)/\sqrt{2})\cdot(-1/\sqrt{2},1/\sqrt{2})=Q \tag{4}$$

Similarly, when the received signal is in the second quadrant, the unit direction vector of the straight line that intersects orthogonally with the straight line that bisects the second quadrant becomes (−1/√2, −1/√2), when the third quadrant side is determined as positive. Therefore, when the output from the delay device 105 is 1, it is possible to express the projection of the rotated received signal to this straight line as shown by the equation (5). When the output from the delay device 105 is 0, it is possible to express the projection as shown by the equation (6).

$$((I+Q)/\sqrt{2},(-I+Q)/\sqrt{2})\cdot(-1/\sqrt{2},-1/\sqrt{2})=-Q \tag{5}$$

$$((I-Q)/\sqrt{2}(I+Q)/\sqrt{2})\cdot(-1/\sqrt{2},-1/\sqrt{2})=-I \tag{6}$$

Similarly, when the received signal is in the third quadrant, the unit direction vector of the straight line that intersects orthogonally with the straight line that bisects the third quadrant becomes (1/√2, −1/√2), when the fourth quadrant side is determined as positive. Therefore, when the output from the delay device 105 is 1, it is possible to express the projection of the rotated received signal to this straight line as shown by the equation (7). When the output from the delay device 105 is 0, it is possible to express the projection as shown by the equation (8).

$$((I+Q)/\sqrt{2},(-I+Q)/\sqrt{2})\cdot(1/\sqrt{2},-1/\sqrt{2})=I \tag{7}$$

$$((I-Q)/\sqrt{2},(I+Q)/\sqrt{2})\cdot(1/\sqrt{2},-1/\sqrt{2})=-Q \tag{8}$$

Similarly, when the received signal is in the fourth quadrant, the unit direction vector of the straight line that intersects orthogonally with the straight line that bisects the fourth quadrant becomes (1/√2, 1/√2), when the first quadrant side is determined as positive. Therefore, when the output from the delay device 105 is 1, it is possible to express the projection of the rotated received signal to this straight line as shown by the equation (9). When the output from the delay device 105 is 0, it is possible to express the projection as shown by the equation (10).

$$((I+Q)/\sqrt{2}, (-I+Q)/\sqrt{2}) \cdot (1/\sqrt{2}, 1/\sqrt{2}) = Q \tag{9}$$

$$((I-Q)/\sqrt{2}, (I+Q)/\sqrt{2}) \cdot (1/\sqrt{2}, 1/\sqrt{2}) = I \tag{10}$$

In other words, the rotation projector 102 selectively outputs:

(1) −I, when the received signal is in the first quadrant, and also when the output from the delay device 105 is 1,
(2) Q, when the received signal is in the first quadrant, and also when the output from the delay device 105 is 0,
(3) −Q, when the received signal is in the second quadrant, and also when the output from the delay device 105 is 1,
(4) −I, when the received signal is in the second quadrant, and also when the output from the delay device 105 is 0,
(5) I, when the received signal is in the third quadrant, and also when the output from the delay device 105 is 1,
(6) −Q, when the received signal is in the third quadrant, and also when the output from the delay device 105 is 0,
(7) Q, when the received signal is in the fourth quadrant, and also when the output from the delay device 105 is 1, and
(8) I, when the received signal is in the fourth quadrant, and also when the output from the delay device 105 is 0.

The output from the adder 106 is the sum of the coarse phase value output from the quadrant deciding section 101 and the output from the one-bit quantizer 104. Therefore, the output from the adder 106 becomes:

(1) 1, when the received signal is in the first quadrant, and also when the output from the integrator 103 is positive,
(2) 0, when the received signal is in the first quadrant, and also when the output from the integrator 103 is negative,
(3) 2, when the received signal is in the second quadrant, and also when the output from the integrator 103 is positive,
(4) 1, when the received signal is in the second quadrant, and also when the output from the integrator 103 is negative,
(5) 3, when the received signal is in the third quadrant, and also when the output from the integrator 103 is positive,
(6) 2, when the received signal is in the third quadrant, and also when the output from the integrator 103 is negative,
(7) 4, when the received signal is in the fourth quadrant, and also when the output from the integrator 103 is positive, and
(8) 3, when the received signal is in the fourth quadrant, and also when the output from the integrator 103 is negative.

In summary, it is possible to express the outputs from the quadrant deciding section 101, the rotation projector 102, and the one-bit quantizer 104 respectively as shown in FIG. 32.

The method of detecting the phase of the received baseband signal is explained based on an example that the reception complex base band signal $A \exp(j\theta)$ (=I+jQ) is in the first quadrant. $I = A \cos\theta$, and $Q = A \sin\theta$.

First, the rotation projector 102 outputs −I or Q to the integrator 103 based on the output from the delay device 105. The integrator 103 integrates the output from the rotation projector 102. The output from the integrator 103 shows the average of the outputs from the rotation projector 102. The one-bit quantizer 104 decides whether the output from the integrator is positive or negative. When the output from the integrator 103 is positive, the one-bit quantizer 104 outputs 1, and at the same time, makes the rotation projector 102 output −I via the delay device 105. When the output from the integrator 103 is negative, the one-bit quantizer 104 outputs 0, and at the same time, makes the rotation projector 102 output Q via the delay device 105. Based on the work of the feedback loop, the output from the integrator 103, that is, the output from the rotation projector 102, is controlled to approach to zero.

The delta sigma modulator (corresponding to the quadrant deciding section 101, the rotation projector 102, the integrator 103, the one-bit quantizer 104, the delay device 105, and the adder 106) is operated by N cycles (where N is a natural number). During this period, when the one-bit quantizer 104 outputs positive values by p times and outputs negative values by q times, "−pI+qQ≈0" and "p+q=N" are established as a result of the feedback control, when N is sufficiently large. As the adder 106 outputs 1 by p times and outputs 0 by q times, the low-pass filter 107 obtains a simple average of the outputs from the adder 106. It is possible to express the output from the low-pass filter 107 as shown by the equation (11).

$$(1 \cdot p + 0 \cdot q)/N = Q/(I+Q) = \tan\theta/(1+\tan\theta) \tag{11}$$

Therefore, the output from the low-pass filter 107 becomes (1) $\tan\theta/(1+\tan\theta) = 0$, when $\theta = 0$,
(2) $\tan\theta/(1+\tan\theta) = 0.366 \approx 1/3$, when $\theta = \pi/6$,
(3) $\tan\theta/(1+\tan\theta) = 1/2$, when $\theta = \pi/4$,
(4) $\tan\theta/(1+\tan\theta) = 0.634 \approx 2/3$, when $\theta = \pi/3$, and
(5) $\tan\theta/(1+\tan\theta) = 1$, when $\theta = \pi/2$.

As a result, $\pi/2$ times the output from the low-pass filter 107 becomes the approximate value of the phase. FIG. 33 shows a relationship between the phase of the input signal to the conventional phase detecting circuit and the detected phase.

FIG. 34 shows waveforms of output signals from the sections of the conventional phase detecting circuit obtained based on a simulation carried out by the computer. In FIG. 34, the horizontal axis shows time, and the unit of the numbers on the horizontal axis is cycle. In FIG. 34, (a) shows the phase of the received baseband signal; (b) shows the in-phase component and the quadrature component of the received baseband signal; (c) shows the output from the rotation projector 102; (d) shows the output from the integrator 103; (e) shows the output from the one-bit quantizer 104; (f) shows the output from the quadrant deciding section 101; (g) shows the output from the adder 106; and (h) shows the output from the low-pass filter 107. As is clear from FIG. 34, the output from the low-pass filter 107 shown in (h) is the result of quantizing the phase of the received baseband signal shown in (a).

The above shows the structure that the reception complex base band signal is directly input to the phase detecting circuit. However, instead of this method, it may be arranged as follows. The received baseband signal is rotated by a certain angle. The phase detecting circuit detects the phase of the signal after the rotation, and obtains the phase of the original received baseband signal by subtracting the phase of the rotated angle from this phase. For example, when the complex base band signal I+jQ is rotated by 45 degrees, and the resultant signal is multiplied by √2, it is possible to express this signal as shown by the equation (12).

$$\sqrt{2} e^{j\pi/4}(I+jQ) = (I-Q) + j(I+Q) \tag{12}$$

Therefore, it is possible to obtain the phase of the received baseband signal in the following order. Signals I−Q, and I+Q are prepared based on the received baseband signal I and Q. The signals I−Q, and I+Q are input to the phase detecting circuit. The phase detecting circuit detects the phases of these signals, and subtracts the quantized value corresponding to 45 degrees from the detected phases.

However, according to the conventional phase detecting circuit shown in FIG. 30, when the position of the received signal changes from the fourth quadrant to the first quadrant, for example, the output from the adder 106 of the conventional phase detecting circuit changes from "3 or 4" to "0 or 1". Therefore, the output from the low-pass filter 107 becomes the intermediate value of around 2, which is a large deviation from around 0 or 4 as a correct phase. As explained above, the conventional phase detecting circuit disregards the cyclicity of the phase, and simply adds the phases. Consequently, there has been a problem that when the phase of the received signal changes by crossing over 0 or 2π, the phase of the signal output from the low-pass filter 107 is not correct (for example, at portion A in (h) in FIG. 34).

The conventional phase detecting circuit has another problem. Let us think of an example that the position of the received baseband signal I+jQ changes from the first quadrant to the second quadrant. The rotation projector 102 outputs −I (a negative value) or Q (a positive value) when the received signal is in the first quadrant. However, when the received signal enters the second quadrant, the rotation projector 102 outputs −Q (a negative value) or I (a positive value). At a position near the boundary between the first quadrant and the second quadrant, the absolute value of I is close to zero, but the absolute value of Q is not small. Therefore, the output from the rotation projector 102 changes based on the data output from the delay device 105. When the delay device 105 outputs 0, the signal Q in the first quadrant changes to −I in the second quadrant. When the delay device 105 outputs 1, the signal −I in the first quadrant changes to −Q in the second quadrant. Thus, there is a large change (for example, at portion B in (c) in FIG. 34). As explained above, the conventional phase detecting circuit has a problem that when the quadrant to which the received signal belongs changes, the output from the rotation projector 102 suddenly changes discontinuously, and a temporary error occurs in the phase detection value (for example, at portion C in (h) in FIG. 34).

Further, the analog FM receiver that uses the conventional phase detecting circuit has a problem that distortion rate characteristic of the demodulation signal becomes degraded, as the phase detection value becomes inaccurate because of the above two problems. Further, the FSK receiver and the PSK receiver that use the conventional phase detecting circuit have a problem that the reception bit error rate characteristic becomes degraded, for similar reasons.

Therefore, it is an object of the present invention to provide a phase detecting circuit that can realize accurate phase detection.

DISCLOSURE OF THE INVENTION

According to the present invention, the phase detecting circuit comprises: a first quantizing unit (corresponding to a phase quantizing section 401 in the embodiment described later) that quantizes the phase of a received baseband signal; a converting and selecting unit (corresponding to a converting selector 402) that linearly converts the received signal based on a predetermined rule, and selectively outputs the signal after the linear transformation; an integrating unit (corresponding to the integrator 103) that integrates the output from the converting and selecting unit; a second quantizing unit (corresponding to the one-bit quantizer 104) that quantizes the integration result by deciding the sign of the integration result; a delay unit (corresponding to the delay device 105) that delays the output from the second quantizing unit by a predetermined first time, and outputs the delayed signal to the converting and selecting unit; an adding unit (corresponding to the adder 1) that adds the output from the first quantizing unit and the output from the second quantizing unit modulo the quantized value of the phase 2π; and a low-pass filter unit (corresponding to the low-pass filter 2) that sequentially latches phase values after the addition with internal shift registers, converts the whole data within the shift registers based on a predetermined rule when the phase values that cross over the quantized value of the phase 2π exist in the whole data, does not carry out the conversion when the phase values that cross over the quantized value of the phase 2π do not exist, averages the phase values in this state, and outputs the phase value after smoothing quantization noise.

According to the next invention, the phase detecting circuit comprises: a first quantizing unit that quantizes the phase of a received baseband signal; a converting and selecting unit (corresponding to a converting selector 403) that linearly converts the received signal based on a predetermined rule, and selectively outputs the signal after the linear transformation; an integrating unit that integrates the output from the converting and selecting unit; a second quantizing unit (corresponding to a one-bit quantizer 5) that quantizes the integration result by deciding the sign of the integration result based on the output from the first quantizing unit; a delay unit that delays the output from the second quantizing unit by a predetermined time, and outputs the delayed signal to the converting and selecting unit; an adding unit that adds the output from the first quantizing unit and the output from the second quantizing unit modulo the quantized value of the phase 2π; and a low-pass filter unit that sequentially latches phase values after the addition with internal shift registers, converts the whole data within the shift registers based on a predetermined rule when the phase values that cross over the quantized value of the phase 2π exist in the whole data, does not carry out the conversion when the phase values that cross over the quantized value of the phase 2π do not exist, averages the phase values in this state, and outputs the phase value after smoothing quantization noise.

According to the next invention, the phase detecting circuit has a delta sigma modulator constituted by the first quantizing unit, the converting and selecting unit, the integrating unit, the second quantizing unit, the delay unit, and the adding unit.

According to the next invention, the phase detecting circuit comprises the delta sigma modulator that has stages of integrators.

According to the present invention, the phase detecting circuit further comprises a sample holding circuit unit (corresponding to a sample holding circuit 3) that holds the received baseband signal at a constant level during a predetermined second time, at a pre-stage of the delta sigma modulator.

According to the next invention, the phase detecting circuit comprises: a quadrant deciding unit (corresponding to the quadrant deciding section 101) that decides the quadrant to which a received signal belongs based on a received baseband signal; a rotation projecting unit (corresponding to the rotation projector 102) that rotates the received signal based on a predetermined rule, and projects the rotated signal to a specific straight line; an integrating unit that integrates the output from the rotation projecting unit; a quantizing unit that quantizes the integration result by deciding the sign of the integration result; a delay unit that delays the quantized signal by a predetermined first time, and outputs the delayed signal to the rotation projecting unit; an adding unit that adds the output from the quadrant deciding unit and the quantized signal modulo the phase $2\pi$; and a low-pass filter unit that sequentially latches phase values after the addition with internal shift registers, converts the phase value to a prescribed specific value when the phase values that cross over $2\pi$ exist in the whole data within the registers, does not carry out the conversion when the phase values that cross over $2\pi$ do not exist, averages the phase values in this state, and outputs the phase value after smoothing quantization noise.

According to the next invention, the phase detecting circuit has a delta sigma modulator constituted by the quadrant deciding unit, the rotation projecting unit, the integrating unit, the quantizing unit, the delay unit, and the adding unit.

According to the next invention, the phase detecting circuit comprises: a quadrant deciding unit that decides the quadrant to which a received signal belongs based on a received baseband signal; a rotation projecting unit (corresponding to a rotation projector 4) that rotates the received signal based on a predetermined rule, and projects the rotated signal to a specific straight line; an integrating unit that integrates the output from the rotation projecting unit; a quantizing unit (corresponding to the one-bit quantizer 5) that quantizes the integration result by deciding the sign of the integration result based on the decided quadrant to which the received signal belongs; a delay unit that delays the quantized signal by a predetermined time, and outputs the delayed signal to the rotation projecting unit; an adding unit that adds the output from the quadrant deciding unit and the quantized signal modulo the phase $2\pi$; and a low-pass filter unit that sequentially latches phase values after the addition with internal shift registers, converts the phase value to a prescribed specific value when the phase values that cross over $2\pi$ exist in the whole data within the registers, does not carry out the conversion when the phase values that cross over $2\pi$ do not exist, averages the phase values in this state, and outputs the phase value after smoothing quantization noise, wherein the quadrant deciding unit, the rotation projecting unit, the integrating unit, the quantizing unit, the delay unit, and the adding unit constitute a delta sigma modulator.

According to the next invention, the phase detecting circuit comprises the delta sigma modulator that has a plurality of stages of integrators.

According to the next invention, the phase detecting circuit further comprises a sample holding circuit unit that holds the received baseband signal at a constant level during a predetermined second time, at a pre-stage of the delta sigma modulator.

According to the next invention, the receiver comprises: a first quantizing unit that quantizes the phase of a received baseband signal; a converting and selecting unit that linearly converts the received baseband signal based on a predetermined rule, and selectively outputs the signal after the linear transformation; an integrating unit that integrates the output from the converting and selecting unit; a second quantizing unit that quantizes the integration result by deciding the sign of the integration result; a delay unit that delays the output from the second quantizing unit by a predetermined first time, and outputs the delayed signal to the converting and selecting unit; an adding unit that adds the output from the first quantizing unit and the output from the second quantizing unit modulo the quantized value of the phase $2\pi$; a low-pass filter unit that sequentially latches phase values after the addition with internal shift registers, converts the whole data within the shift registers based on a predetermined rule when the phase values that cross over the quantized value of the phase $2\pi$ exist in the whole data, does not carry out the conversion when the phase values that cross over the quantized value of the phase $2\pi$ do not exist, averages the phase values in this state, and outputs the phase value after smoothing quantization noise; and a demodulator (corresponding to the demodulator 312) that demodulates the reception data based on the phase value, wherein the first quantizing unit, the converting and selecting unit, the integrating unit, the second quantizing unit, the delay unit, and the adding unit constitute a delta sigma modulator.

According to the next invention, the receiver comprises: a first quantizing unit that quantizes the phase of a received baseband signal; a converting and selecting unit that linearly converts the received baseband signal based on a predetermined rule, and selectively outputs the signal after the linear transformation; an integrating unit that integrates the output from the converting and selecting unit; a second quantizing unit that quantizes the integration result by deciding the sign of the integration result based on the output from the first quantizing unit; a delay unit that delays the output from the second quantizing unit by a predetermined time, and outputs the delayed signal to the converting and selecting unit; an adding unit that adds the output from the first quantizing unit and the output from the second quantizing unit modulo the quantized value of the phase $2\pi$; a low-pass filter unit that sequentially latches phase values after the addition with internal shift registers, converts the whole data within the shift registers based on a predetermined rule when the phase values that cross over the quantized value of the phase $2\pi$ exist in the whole data, does not carry out the conversion when the phase values that cross over the quantized value of the phase $2\pi$ do not exist, averages the phase values in this state, and outputs the phase value after smoothing quantization noise; and a demodulator that demodulates the reception data based on the phase value, wherein the first quantizing unit, the converting and selecting unit, the integrating unit, the second quantizing unit, the delay unit, and the adding unit constitute a delta sigma modulator.

According to the next invention, the receiver differentiates the inputs to the first quantizing unit and the converting and selecting unit.

According to the next invention, the receiver comprises: a quadrant deciding unit that decides the quadrant to which a received signal belongs; a rotation projecting unit that rotates the received signal based on a predetermined rule, and projects the rotated signal to a specific straight line; an integrating unit that integrates the output from the rotation projecting unit; a quantizing unit that quantizes the integration result by deciding the sign of the integration result; a delay unit that delays the quantized signal by a predetermined first time, and outputs the delayed signal to the rotation projecting unit; an adding unit that adds the output from the quadrant deciding unit and the quantized signal modulo the phase $2\pi$; a low-pass filter unit that sequentially latches phase values after the addition with internal shift registers, converts the phase value to a prescribed specific value when the phase values that cross over $2\pi$ exist in the whole data within the registers, does not carry out the conversion when the phase values that cross over $2\pi$ do not exist, averages the phase values in this state, and outputs the phase value after smoothing quantization noise; and a demodulator that demodulates the reception data based on the phase value, wherein the quadrant deciding unit, the rotation projecting unit, the integrating unit, the quantizing unit, the delay unit, and the adding unit constitute a delta sigma modulator.

According to the next invention, the receiver comprises: a quadrant deciding unit that decides the quadrant to which a received signal belongs; a rotation projecting unit that rotates the received signal based on a predetermined rule, and projects the rotated signal to a specific straight line; an integrating unit that integrates the output from the rotation projecting unit; a quantizing unit that quantizes the integration result by deciding the sign of the integration result based on the decided quadrant to which the received signal belongs; a delay unit that delays the quantized signal by a predetermined time, and outputs the delayed signal to the rotation projecting unit; an adding unit that adds the output from the quadrant deciding unit and the quantized signal modulo the phase 2π; a low-pass filter unit that sequentially latches phase values after the addition with internal shift registers, converts the phase value to a prescribed specific values when the phase value that cross over 2πexist in the whole data within the registers, does not carry out the conversion when the phase values that cross over 2π do not exist, averages the phase values in this state, and outputs the phase value after smoothing quantization noise; and a demodulator that demodulates the reception data based on the phase value, wherein the quadrant deciding unit, the rotation projecting unit, the integrating unit, the quantizing unit, the delay unit, and the adding unit constitute a delta sigma modulator.

According to the next invention, the receiver differentiates the inputs to the quadrant deciding unit and the rotation projecting unit.

According to the next invention, the receiver comprises a delta sigma modulator of an M order structure.

According to the next invention, in the receiver, the demodulator comprises: a timing recovering unit (corresponding to a timing recovering section 13) that receives a clock that is L times a symbol clock generated by an oscillator, and the phase value, searches the phase value for a data decision timing with the resolution of 1/L of the symbol clock, and generates a phase detection request timing to operate the low-pass filter unit; and a data deciding unit (corresponding to a data deciding section 14) that decides the reception data based on the phase value and the data decision timing, wherein the low-pass filter unit operates at the phase detection request timing.

According to the next invention, the receiver further comprises a sample holding circuit unit that holds the amplified received baseband signal at a constant level during a predetermined second time, at a pre-stage of the delta sigma modulator.

BRIEF DESCRIPTION OF THE DRAWINGS

FIG. 9 shows outputs (the output pattern B) from a quadrant deciding section, a rotation projector, and a one-bit quantizer;

FIG. 10 shows outputs from the quadrant deciding section, the rotation projector, and the one-bit quantizer;

FIG. 11 shows outputs from the quadrant deciding section, the rotation projector, and the one-bit quantizer;

FIG. 15 shows a result of the decision about the domain to which the received signal belongs;

FIG. 16 shows outputs from the phase quantizing section, the one-bit quantizer, and the converting selector;

FIG. 17 shows outputs from the phase quantizing section, the one-bit quantizer, and the converting selector;

FIG. 18 shows outputs (the output pattern A) from the phase quantizing section, the one-bit quantizer, and the converting selector;

FIG. 19 shows outputs (the output pattern B) from the phase quantizing section, the one-bit quantizer, and the converting selector;

FIG. 32 shows outputs (the output pattern A) from the quadrant deciding section, the rotation projector, and the one-bit quantizer;

BEST MODE FOR CARRYING OUT THE INVENTION

Exemplary embodiments of the phase detecting circuit and the receiver according to the present invention are explained in detail below with reference to the accompanying drawings. These embodiments do not limit the present invention.

Figure 1:
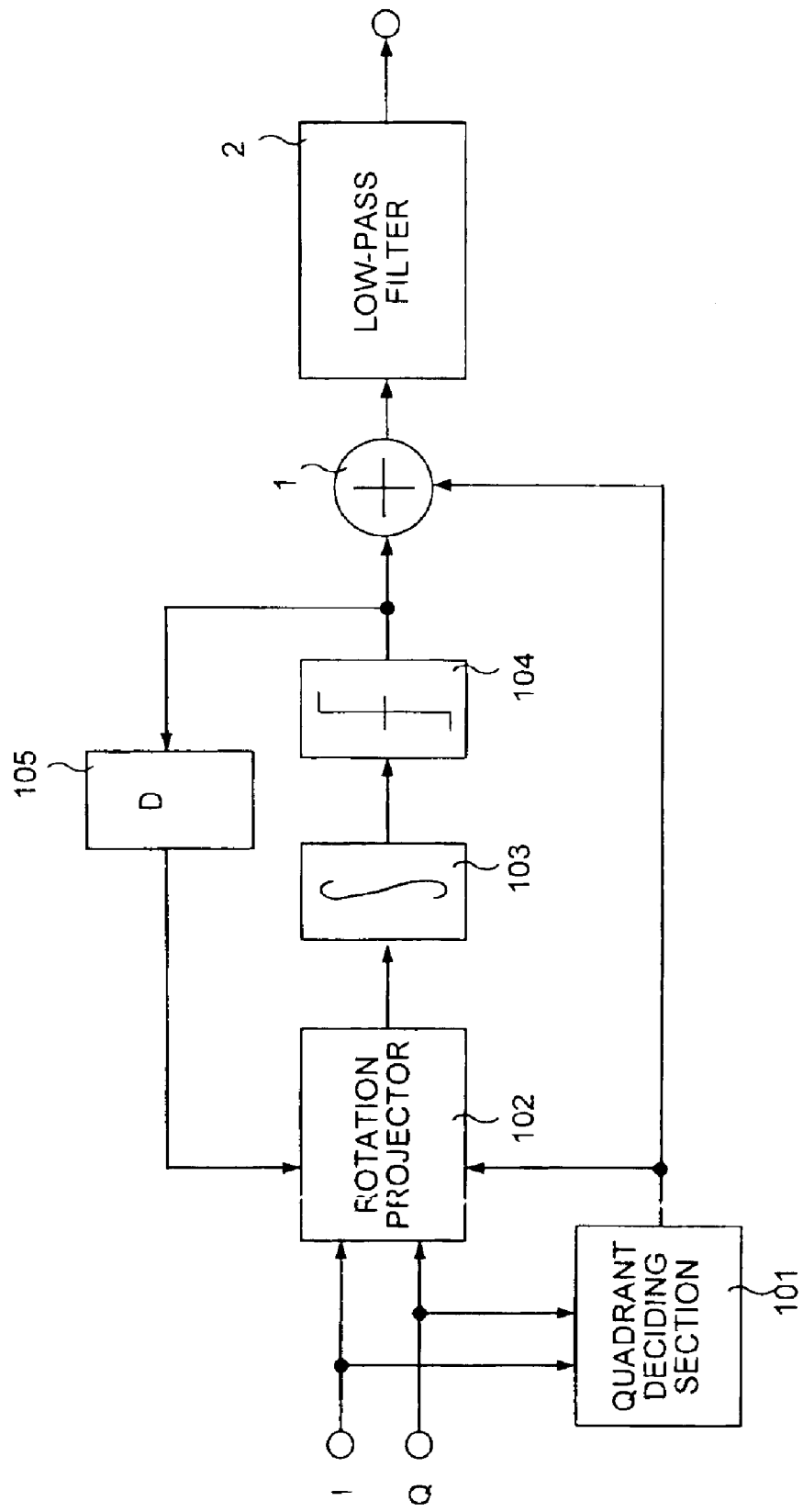
FIG. 1 shows a structure of a phase detecting circuit according to a first embodiment of the present invention.

FIG. 1 shows a structure of a phase detecting circuit according to a first embodiment of the present invention. In FIG. 1, the reference numeral 101 denotes the quadrant deciding section, 102 denotes the rotation projector, 103 denotes the integrator, 104 denotes the one-bit quantizer, 105 denotes the delay device, a reference numeral 1 denotes an adder, and 2 denotes a low-pass filter. In the present embodiment, the quadrant deciding section 101, the rotation projector 102, the integrator 103, the one-bit quantizer 104, the delay device 105, and the adder 1 constitute a delta sigma modulator.

The operation of the phase detecting circuit according to the first embodiment is explained. The sections attached with the same reference numerals as those in the conventional phase detecting circuit carry out similar operations respectively. The quadrant deciding section 101 decides the quadrant to which the received signal belongs based on a positive or negative sign of the in-phase component and the quadrature component of the received baseband signal, and outputs a coarse phase value corresponding to the result of the decision. When the quadrants of the received signals are in the first, the second, the third, and the fourth quadrants, the quadrant deciding section 101 outputs 0, 1, 2, and 3 respectively.

The rotation projector 102 rotates the reception complex base band signal by $+\pi/4$ or $-\pi/4$ corresponding to the data output from the delay device 105. The rotation projector 102 outputs a signed value of the rotated signal projected to a straight line that intersects orthogonally at the origin with a straight line that bisects the quadrant detected by the rotation projector 101. The integrator 103 integrates the output from the rotation projector 102, and the one-bit quantizer 104 quantizes the integrated value. The one-bit quantizer 104 outputs 1 when the output from the integrator 103 is positive, and outputs 0 when this output is negative. The delay device 105 delays the output from the one-bit quantizer 104 by one basic clock (i.e., one cycle) of the delta sigma modulator, and outputs the delayed signal to the rotation projector 102.

The adder 1 adds the coarse phase value output from the quadrant deciding section 101, and the output from the one-bit quantizer 104 modulo the corresponding value of the phase $2\pi$. For example, when the coarse phase values are expressed as 0, 1, 2, and 3, and also when the outputs from the one-bit quantizer 104 are 0 and 1, the adder 1 adds the coarse phase values and the outputs from the one-bit quantizer modulo 4. It is possible to realize this adder easily, by discarding the highest bit of the three-bit adder.

Figure 2:
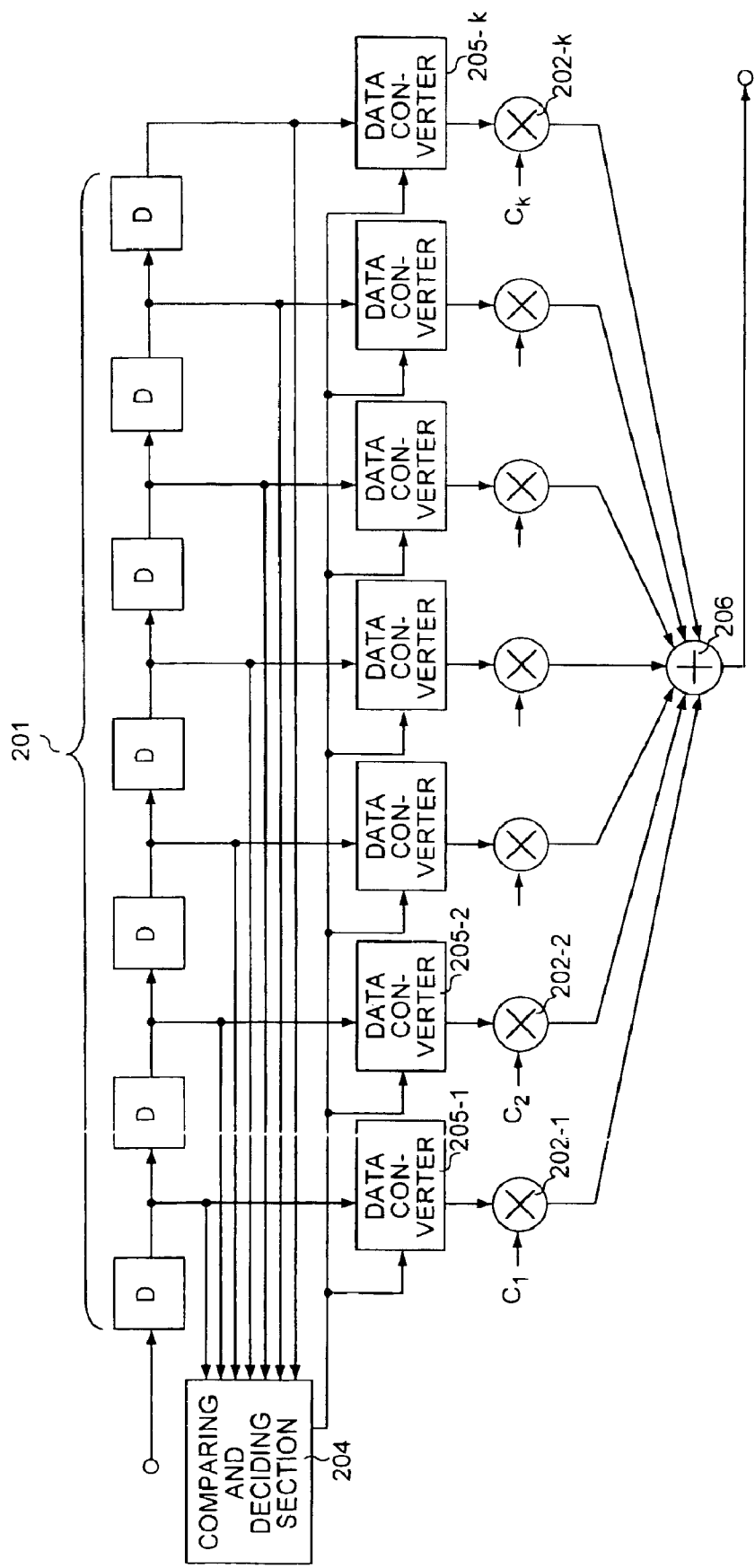
FIG. 2 shows a structure of a low-pass filter.

The low-pass filter 2 smoothes the quantization noise based on the phase data added. FIG. 2 shows a structure of the low-pass filter 2. In FIG. 2, the reference numeral 201 denotes the shift registers, 202-1, 202-2, . . . , and 202-k denote the multipliers, a reference numeral 206 denotes an adder that executes the addition modulo the corresponding value of the phase $2\pi$, 204 denotes a comparing and deciding section, and 205-1, 205-2, . . . , and 205-k denote data converters.

In the low-pass filter 2, the shift registers 201 sequentially receive the inputs of phase data output from the adder 1. When the comparing and deciding section 204 decides that 0 and 3 exist in the contents of the phase data input to the shift registers, the data converters 205-1 to 205-k convert the output data from the shift registers as follows. The data converters convert 0 to 4, and convert 1 to 5, by leaving 2 as 2, and leaving 3 as 3. On the other hand, when the comparing and deciding section 204 decides that 0 and 3 do not exist in the contents of the phase data input to the shift registers, the data converters 205-1 to 205-k output straight the output data from the shift registers, without executing the conversion. The multipliers 202-1 to 202-k multiply the output from each data converter by a coefficient ci (i=1 to k). The adder 206 adds all the multiplied results modulo the phase $2\pi$. The adder 206 executes the addition modulo the phase $2\pi$, by outputting the remainder module to 4, after executing the normal addition.

According to the present embodiment, the adder 1 executes the addition modulo the phase $2\pi$. When the outputs from the shift registers 201 to be executed include the phase data that cross over $2\pi$, the low-pass filter 2 executes the processing by converting the range 0 to $2\pi$ (which correspond to 0 to 3 in the outputs from the shift registers) of the phase data to the range $\pi$ to $3\pi$ (which correspond to 2 to 5 in the outputs from the data converter), and thereafter returns the range of the phase data to 0 to $2\pi$ (which correspond to 0 to 3). Based on this arrangement, it is possible to obtain the accurate result of averaging the phase data. Therefore, it is possible to realize accurate phase detection.

In the first embodiment, the quadrant deciding section 101 quantizes the phase of the received signal in two bits. In the second embodiment, the case where the quantization resolution is N (natural number) is explained.

Figure 3:
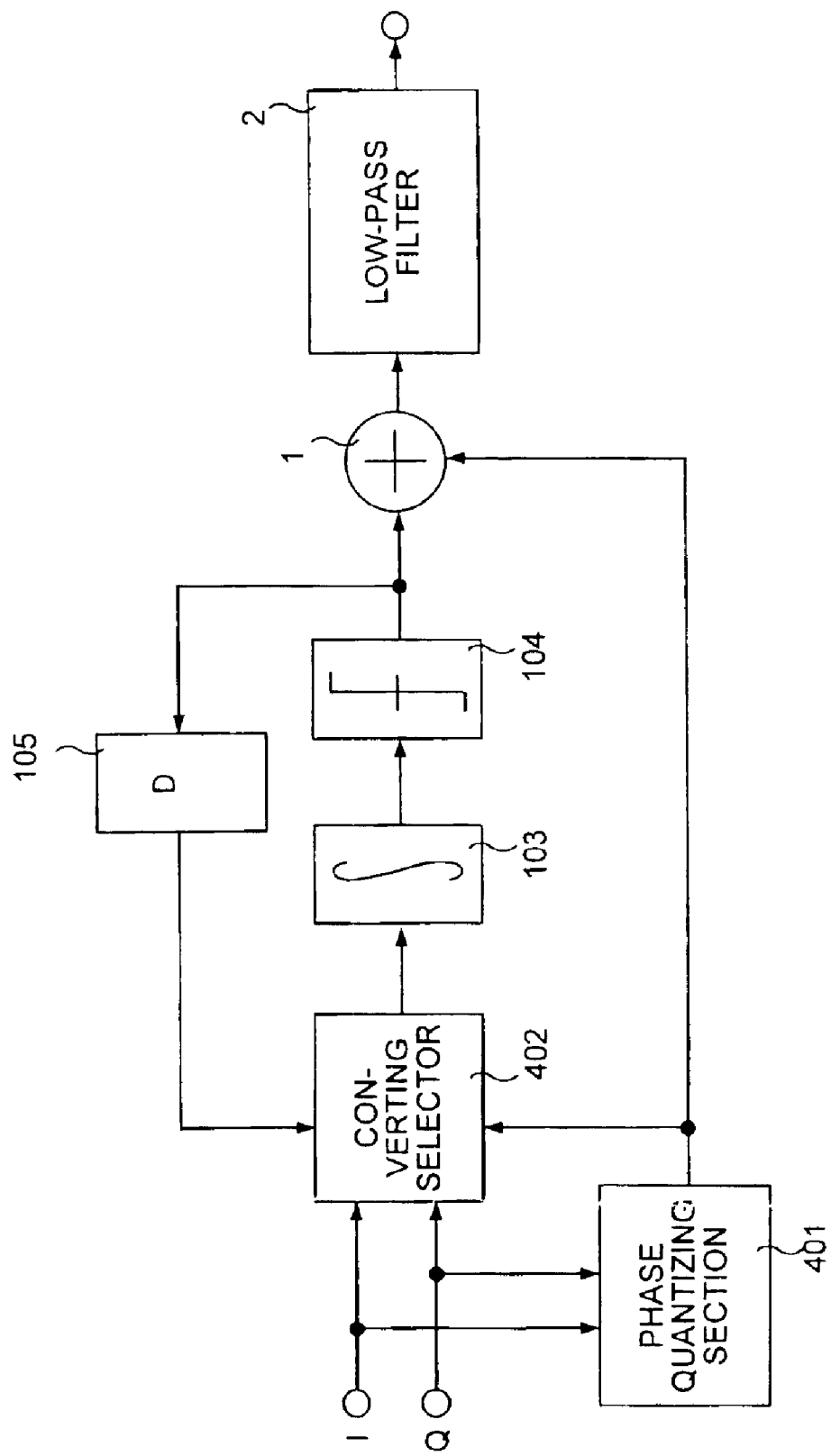
FIG. 3 shows a structure of a phase detecting circuit according to a second embodiment of the present invention.

FIG. 3 shows a structure of a phase detecting circuit according to a second embodiment of the present invention. In FIG. 3, a reference numeral 401 denotes a phase quantizing section, and 402 denotes a converting selector. In FIG. 3, the sections having the same structures as those in the first embodiment are attached with like reference numerals, and their explanation is omitted. In the present embodiment, the phase quantizing section 401, the converting selector 402, the integrator 103, the one-bit quantizer 104, the delay device 105, and the adder 1 constitute the delta sigma modulator.

Figure 4:
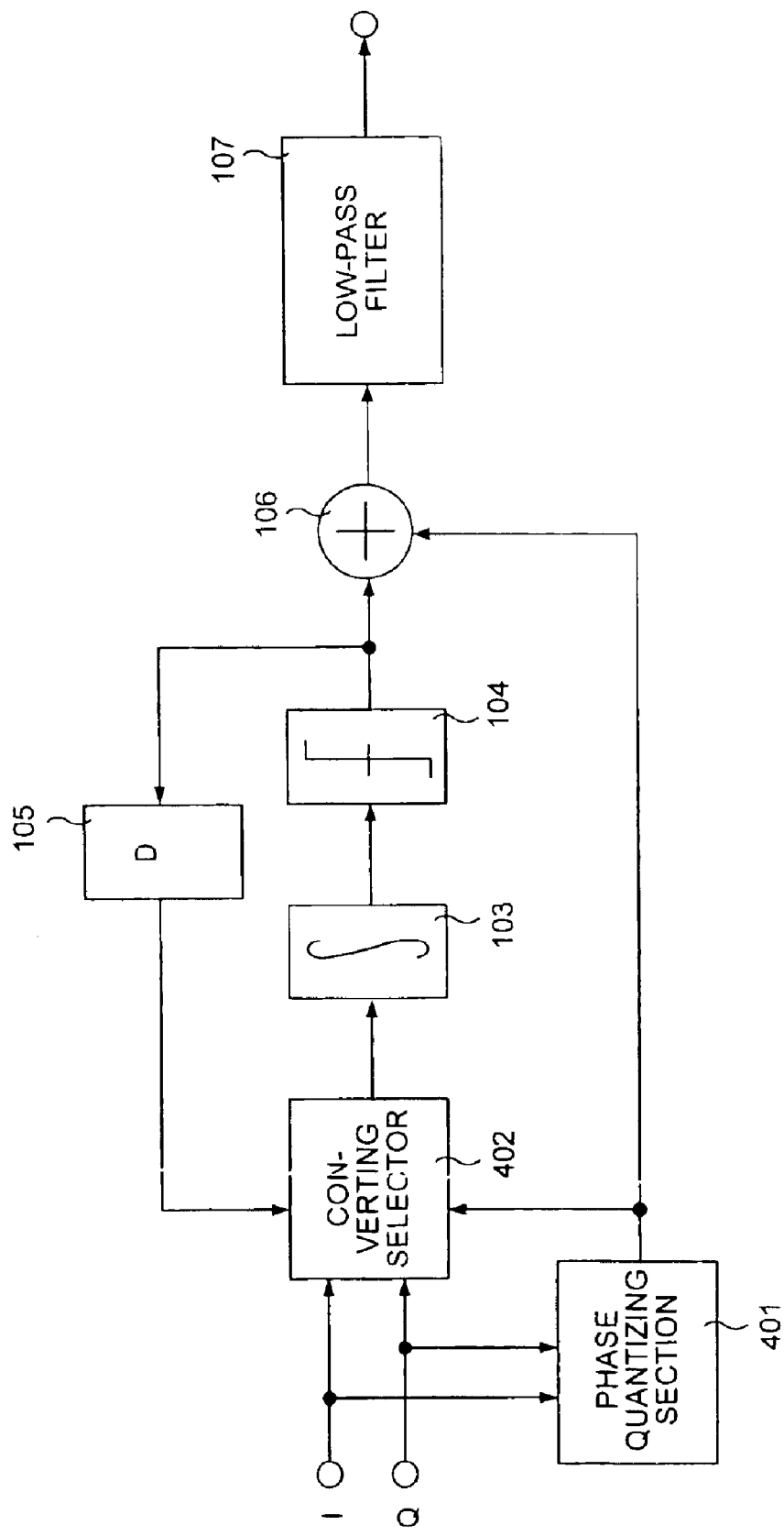
FIG. 4 shows a structure of a general phase detecting circuit when the quantization resolution is N.

Before explaining the operation of the phase detecting circuit according to the second embodiment, the operation of the general phase detecting circuit when the quantization resolution is N will be explained. FIG. 4 shows a structure of the general phase detecting circuit when the quantization resolution is N.

First, the plane of the signal is divided into N sectorial domains based on the central angle of $2\pi/N$, with the origin as the center. A point of the phase equal to or greater than $2(i-1)\pi/N$ and less than $2i\pi/N$ belongs to a domain i (where i is a natural number). The phase quantizing section 401 decides the domain to which the reception complex base band signal belongs, and outputs a phase quantized value that corresponds to the result of the decision. When the received signal belongs to the domain i, the phase quantizing section 401 outputs i−1.

The converting selector 402 rotates the reception complex base band signal by +π/N or −π/N, corresponding to the data output from the delay device 105. Further, the converting selector 402 outputs a signed value of the rotated signal projected to a straight line that intersects orthogonally at the origin with a straight line that bisects the domain that includes the received signal detected by the phase quantizing section 401. The integrator 103 integrates the output from the converting selector 402, and the one-bit quantizer 104 quantizes the integrated value. The one-bit quantizer 104 outputs 0 when the output from the integrator 103 is positive, for example. The adder 106 adds this output value and the phase quantized value output from the phase quantizing section 401. The delay device 105 delays the output from the one-bit quantizer 104 by one basic clock of the delta sigma modulator, and outputs the delayed signal to the converting selector 402.

Figure 5:
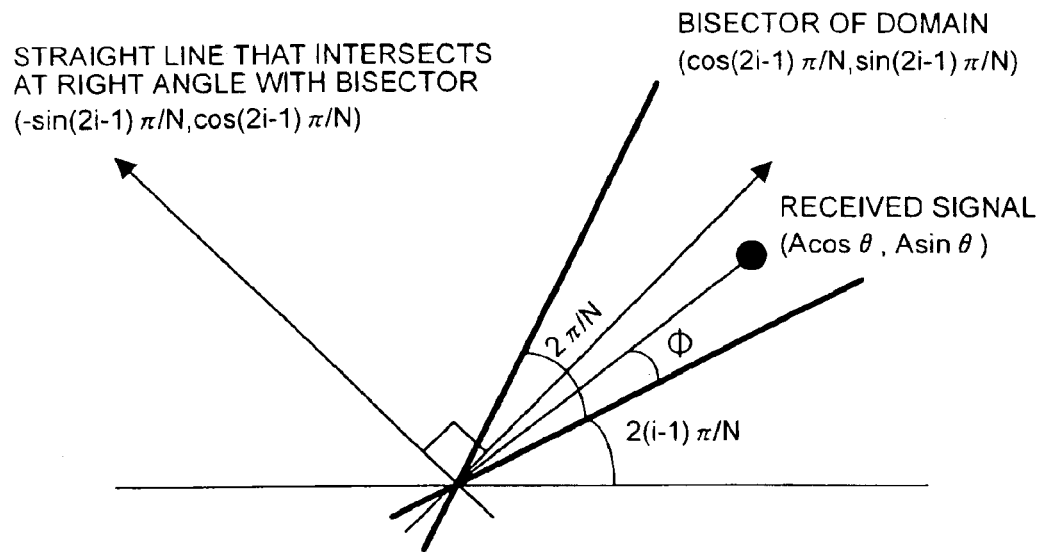
FIG. 5 explains in detail about the operation of a converting selector.

The operation of the converting selector 402 will now be explained in detail. In the following explanation, it is assumed that the reception complex base band signal A exp(jθ) (=I+jQ) belongs to the domain i. As shown in FIG. 5, the phase of the reception complex base band signal is expressed as θ=2 (i−1)π/N+φ. φ is a value equal to or greater than 0 and less than 2 π/N. For example, when the output from the delay device 105 is 1, the received signal is rotated by −π/N, and it is possible to express this signal as shown by the equation (13).

$$A \exp j\theta \cdot \exp\left(-j\frac{\pi}{N}\right) = A \cos\left(j\frac{(2i-3)\pi}{N} + \phi\right) + jA \sin\left(\frac{(2i-3)\pi}{N} + \phi\right) \quad (13)$$

On the other hand, when the output from the delay device 105 is 0, the received signal is rotated by +π/N, and it is possible to express this signal as shown by the equation (14).

$$A \exp j\theta \cdot \exp\left(j\frac{\pi}{N}\right) = A \cos\left(j\frac{(2i-1)\pi}{N} + \phi\right) + jA \sin\left(\frac{(2i-1)\pi}{N} + \phi\right) \quad (14)$$

Next, the converting selector 402 projects this signal to the straight line that intersects orthogonally with the straight line that bisects the region detected by the phase quantizing section 401. The direction of the orthogonal straight line is determined such that the phase increasing direction in the region detected by the phase quantizing section 401 coincides with the positive direction of the straight line. As a result, the unit direction vector of the straight line that intersects orthogonally at the origin with the straight line that bisects the region i becomes (−sin(2i−1) π/N, cos((2i−1) π/N). The projection of the rotated received signal to this straight line is expressed as the inner product of the vector with the unit direction vector of the straight line. Therefore, when the output from the delay device 105 is 1, it is possible to express the projection as shown by the equation (16), and when the output from the delay device 105 is 0, it is possible to express the projection as shown by the equation (16).

$$\left(A\cos\left(\frac{(2i-3)\pi}{N} + \phi\right), A\sin\left(\frac{(2i-3)\pi}{N} + \phi\right)\right) \cdot \quad (15)$$

$$\left(-\sin\frac{(2i-1)\pi}{N}, \cos\frac{(2i-1)\pi}{N}\right) = -A \sin\left(\frac{2\pi}{N} - \phi\right)$$

$$\left(A\cos\left(\frac{(2i-1)\pi}{N} + \phi\right), A\sin\left(\frac{(2i-1)\pi}{N} + \phi\right)\right) \cdot \quad (16)$$

$$\left(-\sin\frac{(2i-1)\pi}{N}, \cos\frac{(2i-1)\pi}{N}\right) = A \sin\phi$$

In other words, it is possible to express the output from the converting selector 402 as shown by the equation (17) or the equation (18). Each output becomes a linear transformation from the reception complex base band signal.

$$-A \sin\left(\frac{2\pi}{N} - \phi\right) = -I \sin\frac{2i\pi}{N} + Q \cos\frac{2i\pi}{N} \quad (17)$$

$$A \sin\phi = -I \sin\frac{2(i-1)\pi}{N} + Q \cos\frac{2(i-1)\pi}{N} \quad (18)$$

As a result, the converting selector 402 first outputs −A sin (2π/N −φ) or A sin φ to the integrator 103. The integrator integrates the received input, and outputs an average value of the outputs from the converting selector 402. The one-bit quantizer 104 decides whether the output from the integrator 103 is positive or negative. When the output from the integrator 103 is positive, the one-bit quantizer outputs 1, and at the same time, makes the converting selector 402 output −A sin (2π/N−φ) via the delay device 105. When the output from the integrator 103 is negative, the one-bit quantizer outputs 0, and at the same time, makes the converting selector 402 output −A sin φ via the delay device 105. Based on the work of the feedback loop, the output from the integrator 103, that is, the output from the converting selector 402, is controlled to approach to zero.

The delta sigma modulator (corresponding to the phase quantizing section 401, the converting selector 402, the integrator 103, the one-bit quantizer 104, the delay device 105, and the adder 106) is operated by M cycles (where M is a natural number). During this period, when the one-bit quantizer 104 outputs positive values by p times and outputs negative values by q times, "−p sin (2π/N−φ)+q sin φ≈0" and "p+q=M" are established as a result of the feedback control, when M is sufficiently large.

As the received signal belongs to the region i, the phase quantizing section 401 outputs i−1, and the one-bit quantizer 104 outputs 1 by p times and outputs 0 by q times. Therefore, the adder 106 outputs i by p times, and outputs i−1 by q times. The low-pass filter 107 obtains a simple average of the outputs from the adder 106, and it is possible to express the output from the low-pass filter 107 as shown by the equation (19).

$$\frac{i \cdot p + (i-1)q}{M} = i - \frac{\sin(2\pi/N - \phi)}{\sin\phi + \sin(2\pi/N - \phi)} \quad (19)$$

In other words, the output from the low-pass filter 107 becomes as follows:
(1) When φ=0, that is, when θ=2 (i−1) π/N, the right-hand side of the equation (17) becomes equal to i−1.
(2) When φ=π/N, that is, when θ=(2i−1) π/N, the right-hand side of the equation (17) becomes equal to i−½.
(3) When φ=2π/N, that is, when θ=2i π/N, the right-hand side of the equation (17) becomes equal to i. As a result, the output of the low-pass filter 107 times 2π/N becomes an approximate value of the phase.

The operation of the phase detecting circuit according to the present embodiment is explained next. Only the operation different from that of the above-described general phase detecting circuit is explained. The adder 1 adds the phase quantized value output from the phase quantizing section 401 and the output from the one-bit quantizer 104 modulo the quantized value of the phase 2π.

The low-pass filter 2 smoothes the quantization noise based on the added phase data, in a similar process to the process according to the first embodiment.

According to the present embodiment, it is possible to obtain the effects similar to those of the first embodiment, and it is also possible to obtain the effects when the quantization resolution is N (natural number).

Figure 6:
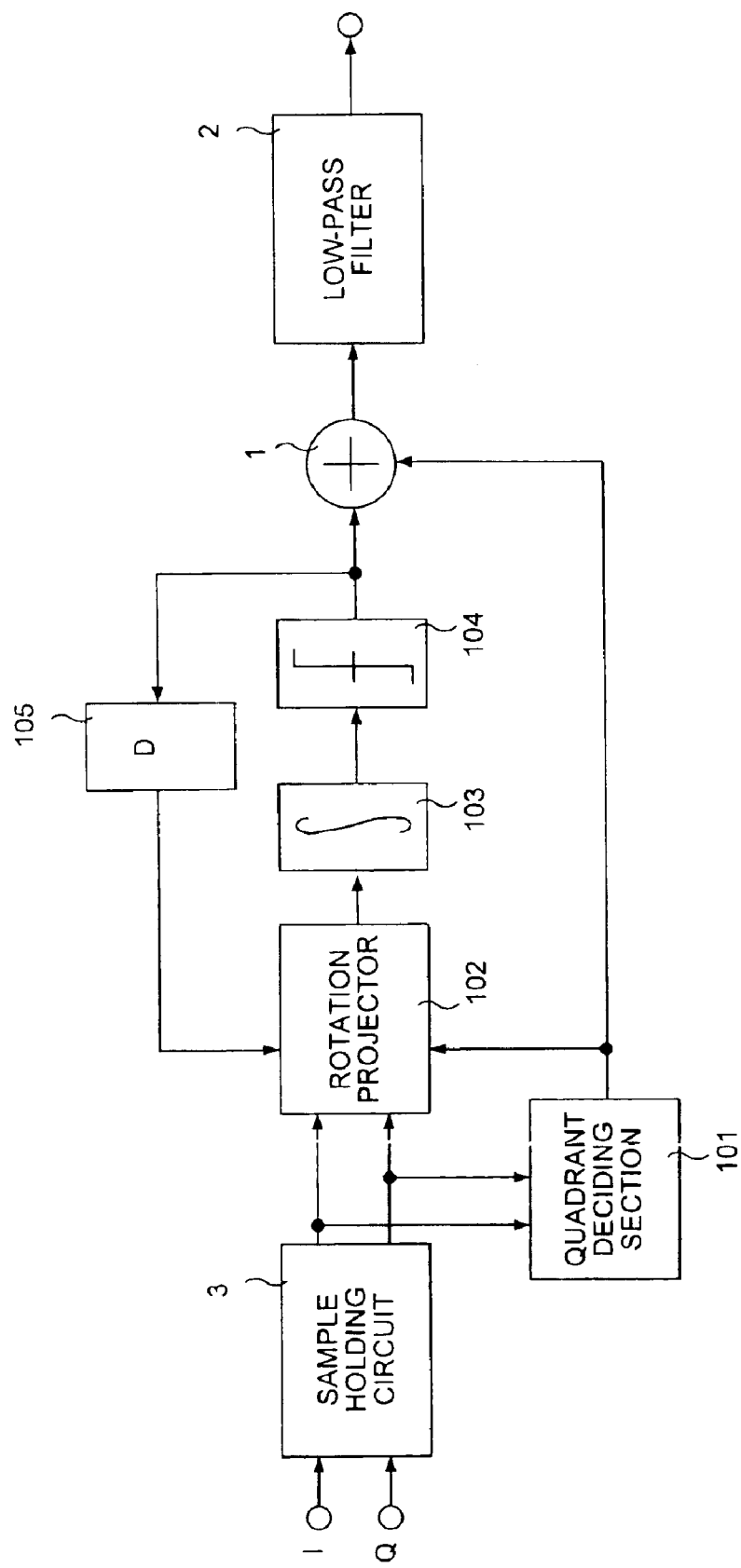
FIG. 6 shows a structure of a phase detecting circuit according to a third embodiment of the present invention.
Figure 7:
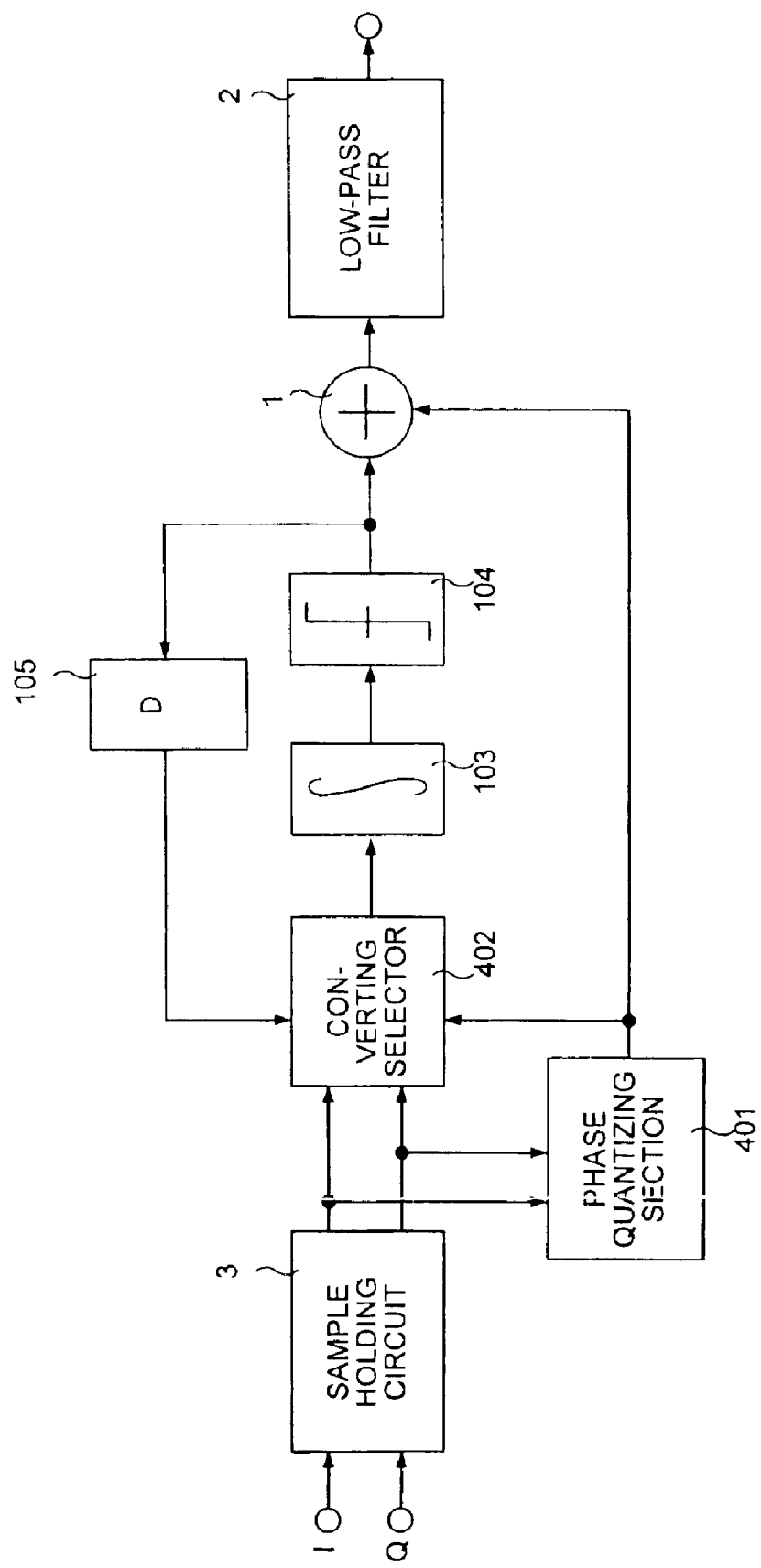
FIG. 7 shows a structure of other phase detecting circuit according to the third embodiment.

FIG. 6 and FIG. 7 show structures of a phase detecting circuit according to the third embodiment. In FIG. 6 and FIG. 7, a reference numeral 3 denotes a sample holding circuit. In FIG. 6 and FIG. 7, the sections having the same structures as those in the first embodiment or the second embodiment are attached with like reference numerals, and their explanation is omitted. The structure shown in FIG. 6 has the sample holding circuit 3 added to the structure (FIG. 1) according to the first embodiment. The structure shown in FIG. 7 has the sample holding circuit 3 added to the structure (FIG. 3) according to the second embodiment. However, the structures of the present embodiment are not limited to these structures. It is also possible to apply the sample holding circuit 3 to the structure shown in FIG. 30 or FIG. 4.

The sample holding circuit 3 holds the received baseband signal at a constant level during the period of N cycles until when a sufficiently high precision quantized value of the phase is obtained based on the delta sigma conversion by the delta sigma modulator (corresponding to the quadrant deciding section 101, the rotation projector 102, the integrator 103, the one-bit quantizer 104, the delay device 105, and the adder 1, in FIG. 6, and also corresponding to the phase quantizing section 401, the converting selector 402, the integrator 103, the one-bit quantizer 104, the delay device 105, and the adder 1, in FIG. 7) within the phase detecting circuit.

According to the present embodiment, the outputs from the rotation projector 102 and the converting selector 402 become constant during the operation of the delta sigma modulator. Therefore, it is possible to obtain a more accurate phase detection value.

According to the third embodiment, the received baseband signal is held at a constant level during the period of N cycles until when a sufficiently high precision quantized value of the phase is obtained based on the delta sigma conversion. Therefore, the following problems remain.

For example, in the FSK or the PSK of the digital modulation system, the transmission signal takes a value having a constant frequency or a constant phase at each symbol clock. Actually, the band is limited to restrict the spread of the spectrum of the transmission signal. Therefore, the transmission signal takes a constant frequency or a constant phase at a specific timing of each symbol clock. The frequency and the phase change smoothly at other portions. Consequently, the receiver cannot decide a frequency or a phase at an optional timing. The receiver needs to find the timing when the transmission signal takes a constant frequency or a constant phase, and decide the data in synchronism with this timing. Therefore, the receiver usually detects the frequency or the phase of the received signal at intervals of ⅛ or 1/16 of the symbol clock, and finds a suitable data decision timing from among these frequencies or phases.

When the phase detecting circuit according to the third embodiment detects a phase at the period of ⅛ of the symbol clock, for example, the sample holding circuit 3 holds the base band signal received at each detection timing, and the delta sigma modulator is operated by N cycles. Therefore, clocks of eight N times the symbol clock are necessary, which results in large power consumption.

Figure 8:
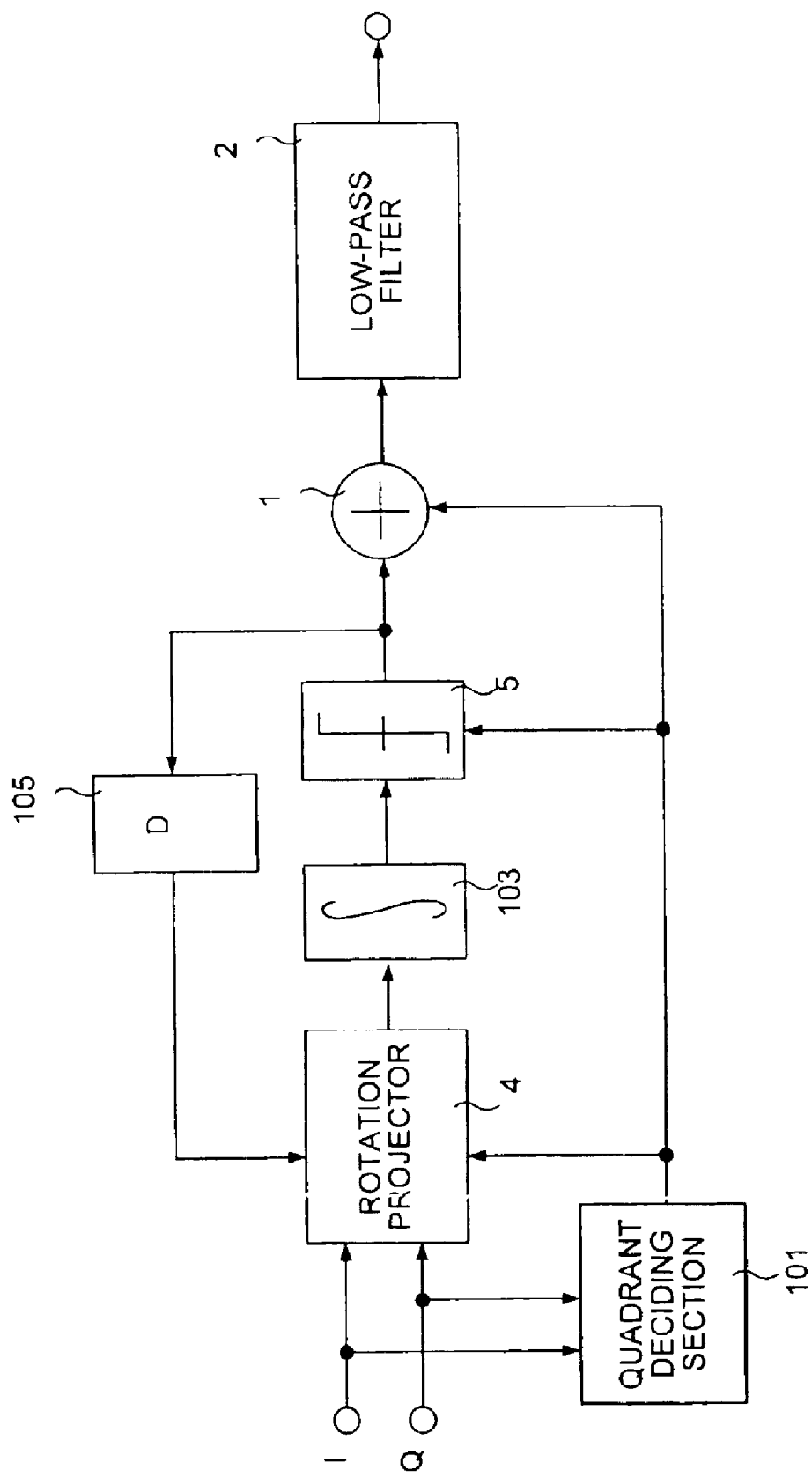
FIG. 8 shows a structure of a phase detecting circuit according to a fourth embodiment of the present invention.

The fourth embodiment solves the above problems. FIG. 8 shows a structure of the phase detecting circuit according to a fourth embodiment of the present invention. In FIG. 8, a reference numeral 4 denotes a rotation projector that carries out the operation different from that of the rotation projector 102, and 5 denotes a one-bit quantizer that carries out the operation different from that of the one-bit quantizer 104. In FIG. 8, the sections having the same structures as those in the first to the third embodiments are attached with like reference numerals, and their explanation is omitted. In the present embodiment, the quadrant deciding section 101, the rotation projector 4, the integrator 103, the one-bit quantizer 5, the delay device 105, and the adder 1 constitute the delta sigma modulator. The structure shown in FIG. 8 is a modified structure of the structure (FIG. 1) according to the first embodiment, for convenience of explanation. However, the structure according to the present embodiment is not limited to this structure. For example, it is also possible to modify the conventional structure (FIG. 30) to obtain the structure of the present embodiment.

The operation of the phase detecting circuit according to the third embodiment is explained next. The sections having the same reference numerals as those according to the first embodiment carry out similar operations.

The rotation projector 4 and the one-bit quantizer 5 operate according to the output from the quadrant deciding section 101. For example, the one-bit quantizer 5 decides the sign of the output from the integrator 103 according to the output from the quadrant deciding section 101, and outputs:
(1) 1, when the received signal is in the first quadrant, and also when the output from the integrator 103 is positive,
(2) 0, when the received signal is in the first quadrant, and also when the output from the integrator 103 is negative,
(3) 0, when the received signal is in the second quadrant, and also when the output from the integrator 103 is positive,
(4) 1, when the received signal is in the second quadrant, and also when the output from the integrator 103 is negative,
(5) 1, when the received signal is in the third quadrant, and also when the output from the integrator 103 is positive,
(6) 0, when the received signal is in the third quadrant, and also when the output from the integrator 103 is negative,
(7) 0, when the received signal is in the fourth quadrant, and also when the output from the integrator 103 is positive, and
(8) 1, when the received signal is in the fourth quadrant, and also when the output from the integrator 103 is negative.
The rotation projector 4 selectively outputs:
(1) −I, when the received signal is in the first quadrant, and also when the output from the delay device 105 is 1,
(2) Q, when the received signal is in the first quadrant, and also when the output from the delay device 105 is 0,
(3) Q, when the received signal is in the second quadrant, and also when the output from the delay device 105 is 1,
(4) I, when the received signal is in the second quadrant, and also when the output from the delay device 105 is 0,
(5) I, when the received signal is in the third quadrant, and also when the output from the delay device 105 is 1,
(6) −Q, when the received signal is in the third quadrant, and also when the output from the delay device 105 is 0,
(7) −Q, when the received signal is in the fourth quadrant, and also when the output from the delay device 105 is 1, and (8) −I, when the received signal is in the fourth quadrant, and also when the output from the delay device 105 is 0.

The one-bit quantizer 5 decides the sign of the output from the integrator 103 according to the output from the quadrant deciding section 101, and outputs:

(1) 0, when the received signal is in the first quadrant, and also when the output from the integrator 103 is positive,
(2) 1, when the received signal is in the first quadrant, and also when the output from the integrator 103 is negative,
(3) 1, when the received signal is in the second quadrant, and also when the output from the integrator 103 is positive,
(4) 0, when the received signal is in the second quadrant, and also when the output from the integrator 103 is negative,
(5) 0, when the received signal is in the third quadrant, and also when the output from the integrator 103 is positive,
(6) 1, when the received signal is in the third quadrant, and also when the output from the integrator 103 is negative,
(7) 1, when the received signal is in the fourth quadrant, and also when the output from the integrator 103 is positive, and
(8) 0, when the received signal is in the fourth quadrant, and also when the output from the integrator 103 is negative.

The rotation projector 4 selectively outputs:
(1) I, when the received signal is in the first quadrant, and also when the output from the delay device 105 is 1,
(2) −Q, when the received signal is in the first quadrant, and also when the output from the delay device 105 is 0,
(3) −Q, when the received signal is in the second quadrant, and also when the output from the delay device 105 is 1,
(4) −I, when the received signal is in the second quadrant, and also when the output from the delay device 105 is 0,
(5) −I, when the received signal is in the third quadrant, and also when the output from the delay device 105 is 1,
(6) Q, when the received signal is in the third quadrant, and also when the output from the delay device 105 is 0,
(7) Q, when the received signal is in the fourth quadrant, and also when the output from the delay device 105 is 1, and
(8) I, when the received signal is in the fourth quadrant, and also when the output from the delay device 105 is 0.

The reason why it is possible to detect each phase based on the above operation is explained. In the phase detecting circuit according to the first embodiment, the one-bit quantizer outputs 1 when the output from the integrator 103 is positive, and outputs 0 when the output from the integrator 103 is negative, and the rotation projector 102 selectively outputs:

(1) −I, when the received signal is in the first quadrant, and also when the output from the delay device 105 is 1,
(2) Q, when the received signal is in the first quadrant, and also when the output from the delay device 105 is 0,
(3) −Q, when the received signal is in the second quadrant, and also when the output from the delay device 105 is 1,
(4) −I, when the received signal is in the second quadrant, and also when the output from the delay device 105 is 0,
(5) I, when the received signal is in the third quadrant, and also when the output from the delay device 105 is 1,
(6) −Q, when the received signal is in the third quadrant, and also when the output from the delay device 105 is 0,
(7) Q, when the received signal is in the fourth quadrant, and also when the output from the delay device 105 is 1, and
(8) I, when the received signal is in the fourth quadrant, and also when the output from the delay device 105 is 0.

In summary, it is possible to express the outputs from the quadrant deciding section 101, the rotation projector 4, and the one-bit quantizer 5 respectively as shown in FIG. 32. The pattern of these outputs is called the output pattern A, for convenience.

On the other hand, when the positive or negative sign of the signal output from the rotation projector 4 is inverted, the sign of the output from the integrator 103 is also inverted. In this case, when the sign of the output signal is inverted, the decision made by the one-bit quantizer 5 is set opposite at the same time, so that the one-bit quantizer 5 outputs 0 when the output from the integrator 103 is positive, and outputs 1 when the output from the integrator 103 is negative. When the signs are inverted as explained above, the outputs made from the one-bit quantizer 5 remain unchanged.

In other words, the one-bit quantizer 5 outputs 0 when the output from the integrator 103 is positive, and outputs 1 when the output from the integrator 103 is negative, and the rotation projector 4 selectively outputs:

(1) I, when the received signal is in the first quadrant, and also when the output from the delay device 105 is 1,
(2) −Q, when the received signal is in the first quadrant, and also when the output from the delay device 105 is 0,
(3) Q, when the received signal is in the second quadrant, and also when the output from the delay device 105 is 1,
(4) I, when the received signal is in the second quadrant, and also when the output from the delay device 105 is 0,
(5) −I, when the received signal is in the third quadrant, and also when the output from the delay device 105 is 1,
(6) Q, when the received signal is in the third quadrant, and also when the output from the delay device 105 is 0,
(7) −Q, when the received signal is in the fourth quadrant, and also when the output from the delay device 105 is 1, and
(8) −I, when the received signal is in the fourth quadrant, and also when the output from the delay device 105 is 0.

In summary, it is possible to express the outputs from the quadrant deciding section 101, the rotation projector 4, and the one-bit quantizer 5 respectively as shown in FIG. 9. The pattern of these outputs is called the output pattern B, for convenience.

The phase detecting circuit according to the present embodiment outputs the output patterns A and B in combination for each quadrant. In other words, the phase detecting circuit outputs the output pattern A when the received signal is in the first quadrant, outputs the output pattern B when the received signal is in the second quadrant, outputs the output pattern A when the received signal is in the third quadrant, and outputs the output pattern B when the received signal is in the fourth quadrant (as shown in FIG. 10). Alternatively, the phase detecting circuit outputs the output pattern B when the received signal is in the first quadrant, outputs the output pattern A when the received signal is in the second quadrant, outputs the output pattern B when the received signal is in the third quadrant, and outputs the output pattern A when the received signal is in the fourth quadrant (as shown in FIG. 11).

Based on the above arrangement, in FIG. 10, for example, when the received baseband signal I+jQ shifts from the first quadrant to the second quadrant, the rotation projector 4 outputs −I (a negative value) or Q (a positive value) when the received signal is in the first quadrant, and outputs I (a negative value) or Q (a positive value) when the received signal shifts to the second quadrant. The absolute value of I is close to zero, at a position near the boundary between the first quadrant and the second quadrant. Therefore, the change in the output from the rotation projector 4 becomes small.

According to the present embodiment, even when the quadrant to which the received signal belongs changes, the change in the output from the rotation projector 4 becomes small, as the absolute value of I is close to zero at a position near the boundary between the quadrants. As a result, the phase detection value obtained by the delta sigma modulator becomes accurate. In the present embodiment, it is also possible to use the sample holding circuit 3, like in the structure according to the third embodiment.

Figure 12:
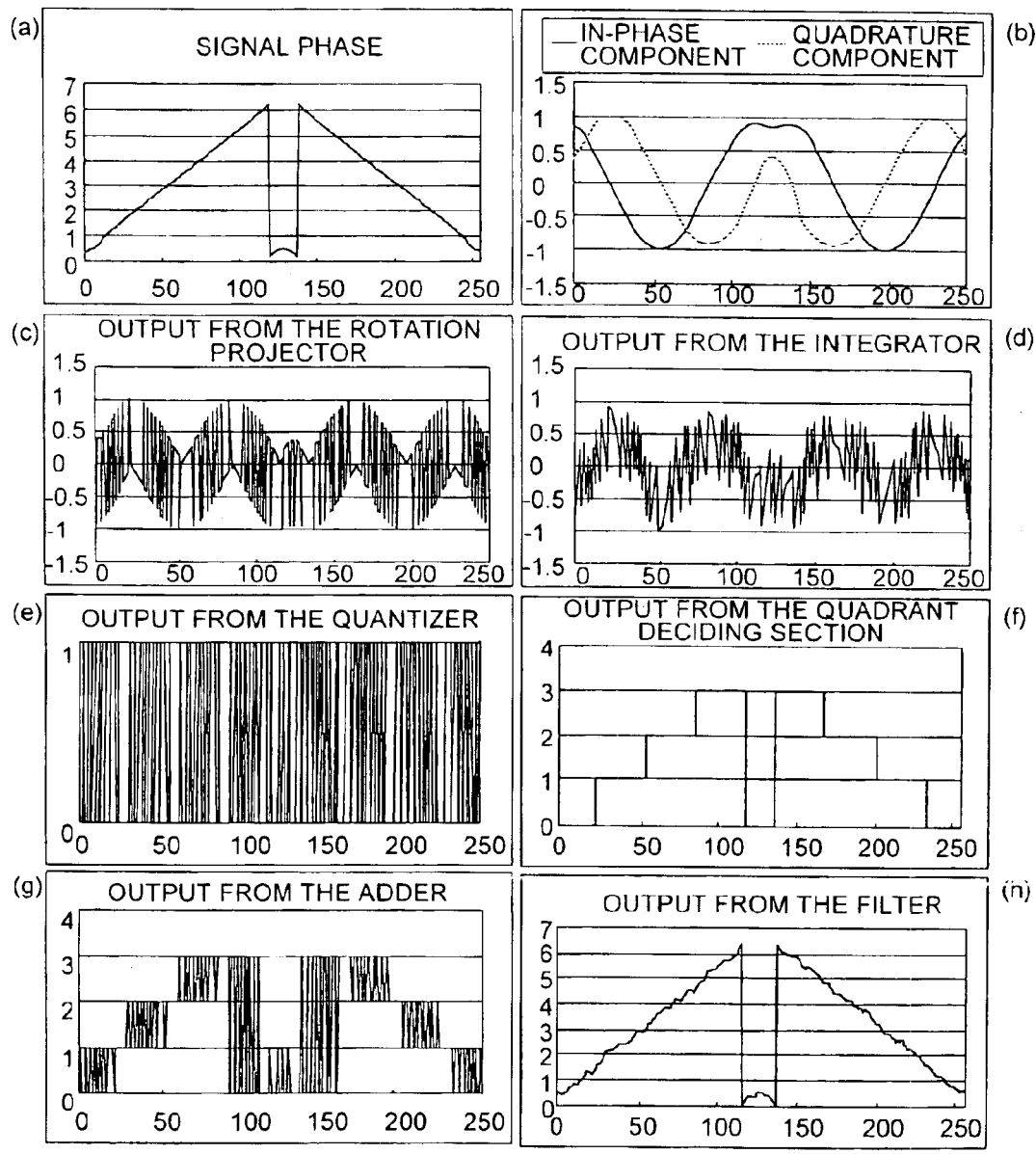
FIG. 12 shows waveforms of output signals from the sections of the phase detecting circuit according to the fourth embodiment obtained based on a simulation carried out by the computer.

FIG. 12 shows waveforms of output signals from the sections of the phase detecting circuit according to the fourth embodiment obtained based on a simulation carried out by the computer. In FIG. 12, the horizontal axis shows time, and the unit of the numbers on the horizontal axis is cycle. In FIG. 12, (a) shows the phase of the received baseband signal; (b) shows the in-phase component and the quadrature component of the received baseband signal; (c) shows the output from the rotation projector 4; (d) shows the output from the integrator 103; (e) shows the output from the one-bit quantizer 5; (f) shows the output from the quadrant deciding section 101; (g) shows the output from the adder 1; and (h) shows the output from the low-pass filter 2. As is clear from FIG. 12, in the present embodiment, even when the quadrant to which the received signal belongs changes, the error in the phase detection value becomes smaller than that in the conventional phase detecting circuit.

In the fourth embodiment, the quadrant deciding section 101 quantizes the phase of the received signal in two bits. In the fifth embodiment, as an exemplification of the case where the quantization resolution is N (natural number), the quantization of the phase of the received signal in three bits is explained.

Figure 13:
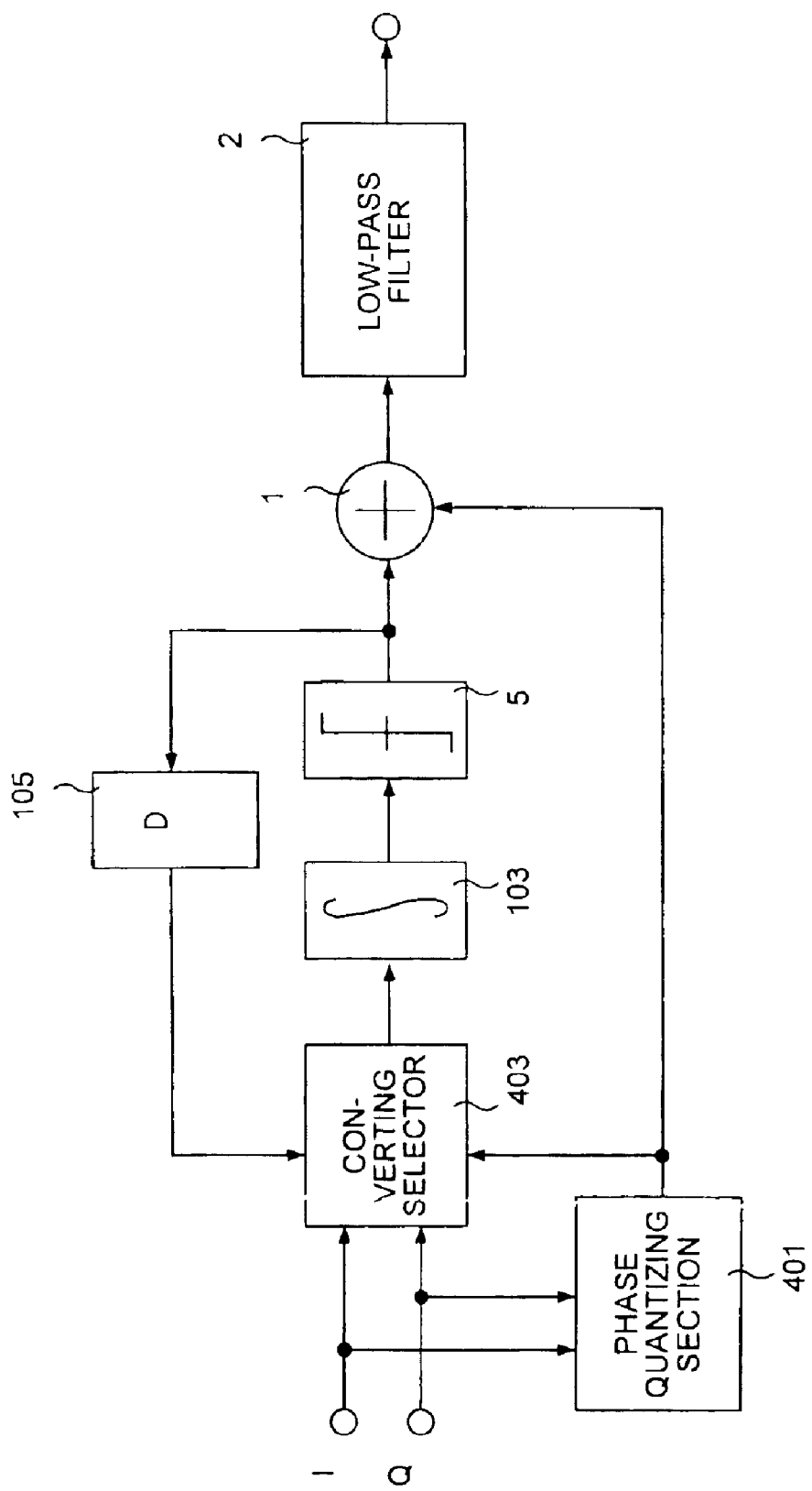
FIG. 13 shows a structure of a phase detecting circuit according to a fifth embodiment of the present invention.
Figure 14:
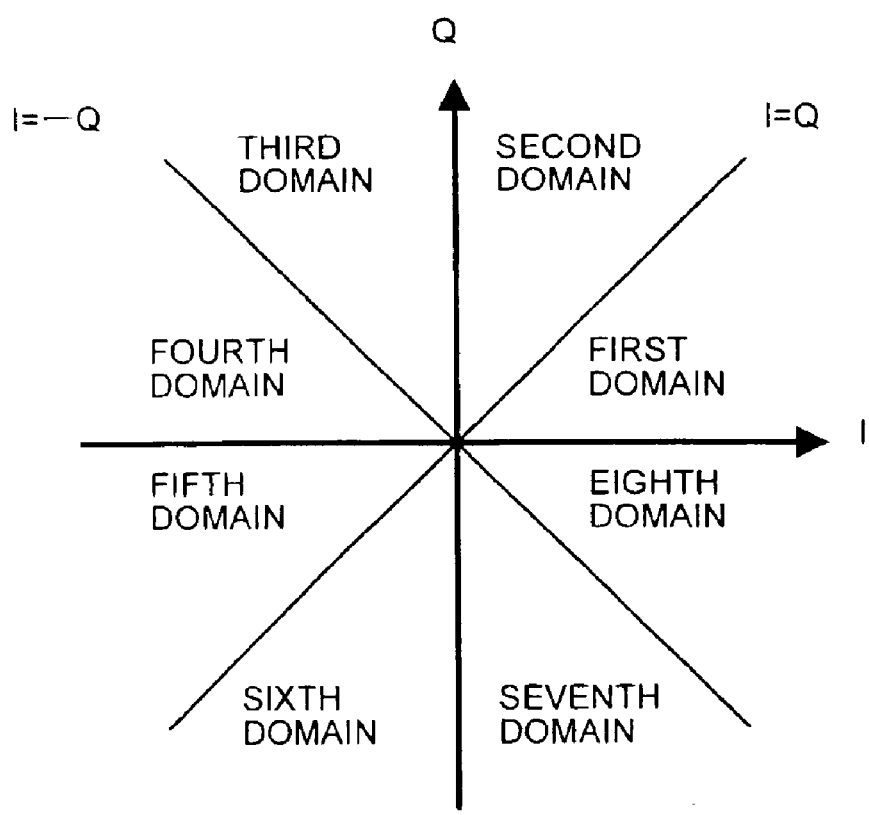
FIG. 14 explains in detail about the operation of the phase detecting circuit according to the fifth embodiment.

FIG. 13 shows a structure of a phase detecting circuit according to a fifth embodiment of the present invention. A reference numeral 403 denotes a converting selector. In FIG. 13, the sections having the same structures as those in the fourth embodiment are attached with like reference numerals, and their explanation is omitted. FIG. 14 explains in detail about the operation of the phase detecting circuit according to the fifth embodiment.

First, the plane of the signal is divided into eight sectorial domains based on the central angle of $\pi/4$, with the origin as the center. A point of the phase equal to or greater than $(i-1)\pi/4$ and less than $i\pi/4$ belongs to the domain i (where i is a natural number). The phase quantizing section 401 decides the domain to which the reception complex base band signal belongs, and outputs a phase quantized value that corresponds to the result of the decision. When the received signal belongs to the domain i, the phase quantizing section 401 outputs i-1. The phase quantizing section 401 decides the quadrant to which the received signal belongs based on a positive or negative sign of the in-phase component and the quadrature component of the received baseband signal and the size of the absolute value, and outputs the phase quantized value corresponding to the result of the decision, as shown in FIG. 15.

The converting selector 403 and the one-bit quantizer 5 operate according to the output from the phase quantizing section 401. The one-bit quantizer 5 decides the sign of the output from the integrator 103 according to the output from the phase quantizing section 401. FIG. 16 and FIG. 17 show outputs from the phase quantizing section 401, the one-bit quantizer 5, and the converting selector 403.

The reason why it is possible to detect each phase based on the above operation is explained. In the phase detecting circuit according to the second embodiment, it is possible to express the outputs from the one-bit quantizer 5 and the converting selector 403 as shown in FIG. 18. The pattern of these outputs is called the output pattern A, for convenience.

On the other hand, when the positive or negative sign of the signal output from the converting selector 403 is inverted, the sign of the output from the integrator 103 is also inverted. In this case, when the sign of the output signal is inverted, the decision made by the one-bit quantizer 5 is set opposite at the same time, so that the one-bit quantizer 5 outputs 0 when the output from the integrator 103 is positive, and outputs 1 when the output from the integrator 103 is negative. When the signs are inverted as explained above, the outputs made from the one-bit quantizer 5 remain unchanged. It is possible to express the outputs from the one-bit quantizer 5 and the converting selector 403 as shown in FIG. 19. The pattern of these outputs is called the output pattern B, for convenience.

The phase detecting circuit according to the present embodiment outputs the output patterns A and B in combination for each domain. In other words, the phase detecting circuit outputs the output pattern A when the received signal is in an odd-order domain, and outputs the output pattern B when the received signal is in an even-order domain (as shown in FIG. 16). Alternatively, the phase detecting circuit outputs the output pattern B when the received signal is in an odd-order domain, and outputs the output pattern A when the received signal is in an even-order domain (as shown in FIG. 17).

Based on the above arrangement, in FIG. 16, for example, when the received baseband signal I+jQ shifts from the first domain to the second domain, the one-bit quantizer 403 outputs Q (a positive value) or $-(I-Q)/\sqrt{2}$ (a negative value), and outputs I (a positive value) or $(I-Q)/\sqrt{2}$ (a negative value) when the received signal shifts to the second domain. The absolute value of $(I-Q)/\sqrt{2}$ is close to zero, at a position near the boundary between the first domain and the second domain, and the values of I and Q are substantially equal. Therefore, the change in the output from the converting selector 403 becomes small.

According to the present embodiment, even when the quadrant to which the received signal belongs changes, the change in the output from the converting selector 403 becomes small, as the absolute value of $(I-Q)/\sqrt{2}$ is close to zero at a position near the boundary between the quadrants, and also because the values of I and Q are substantially equal. As a result, the phase detection value obtained by the delta sigma modulator becomes accurate. In the present embodiment, it is also possible to use the sample holding circuit 3, like in the structure according to the third embodiment.

Figure 20:
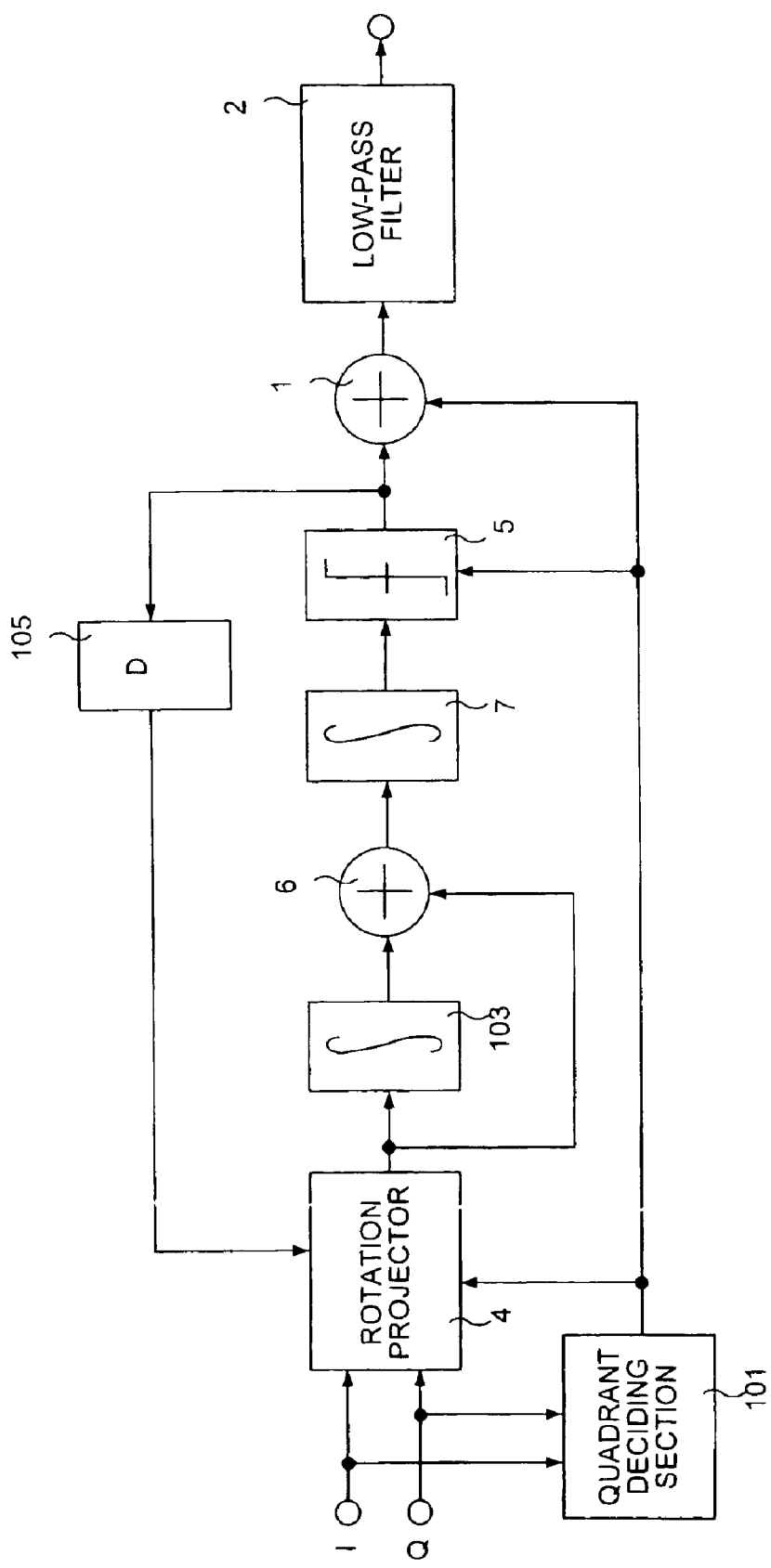
FIG. 20 shows a structure of a phase detecting circuit according to a sixth embodiment of the present invention.
Figure 30:
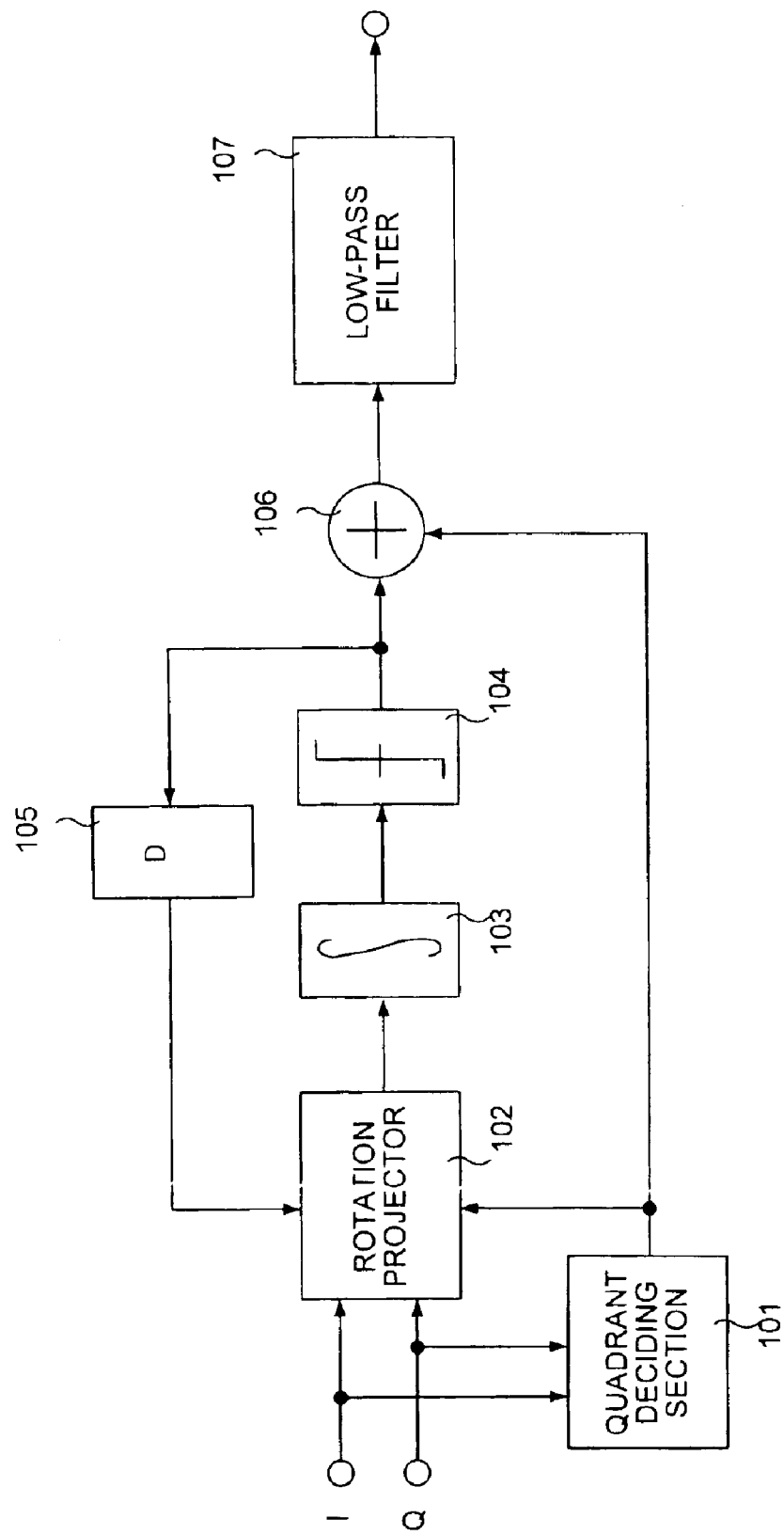
FIG. 30 shows a structure of the conventional phase detecting circuit.
Figure 31:
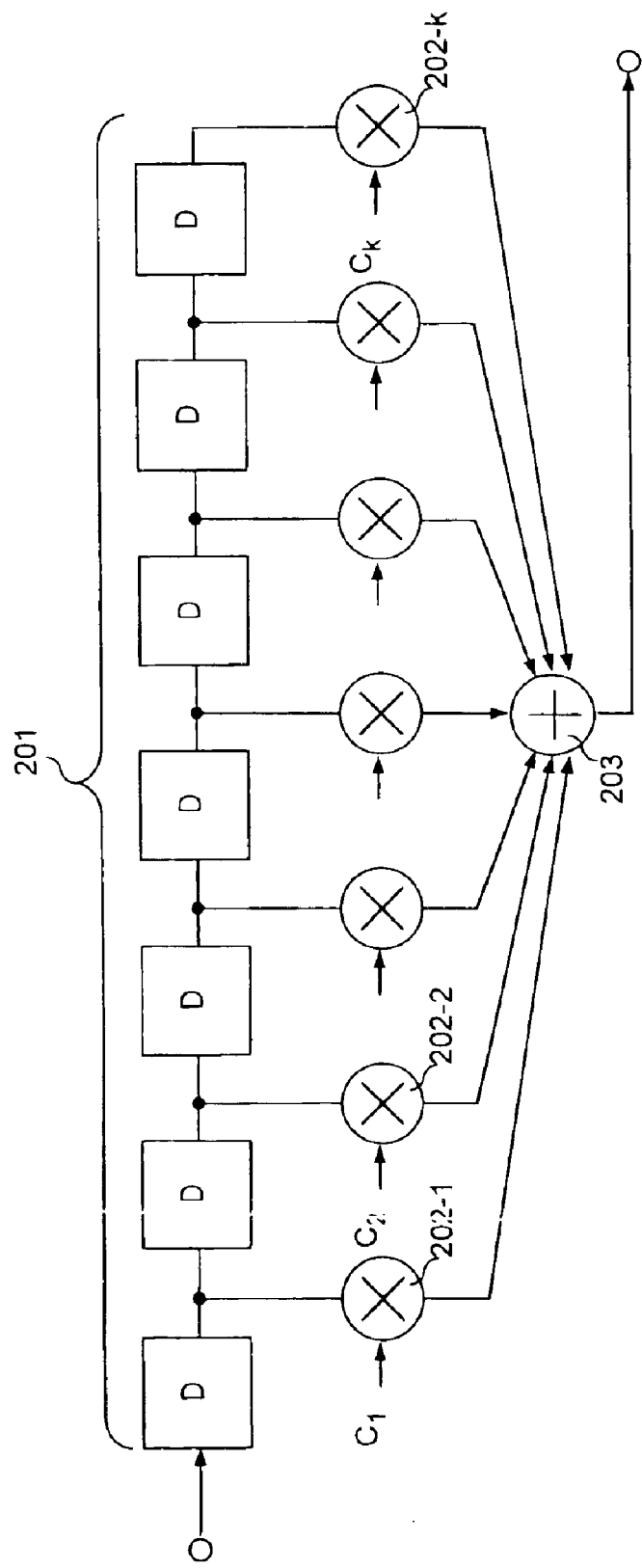
FIG. 31 shows a structure of the conventional low-pass filter.
Figure 33:
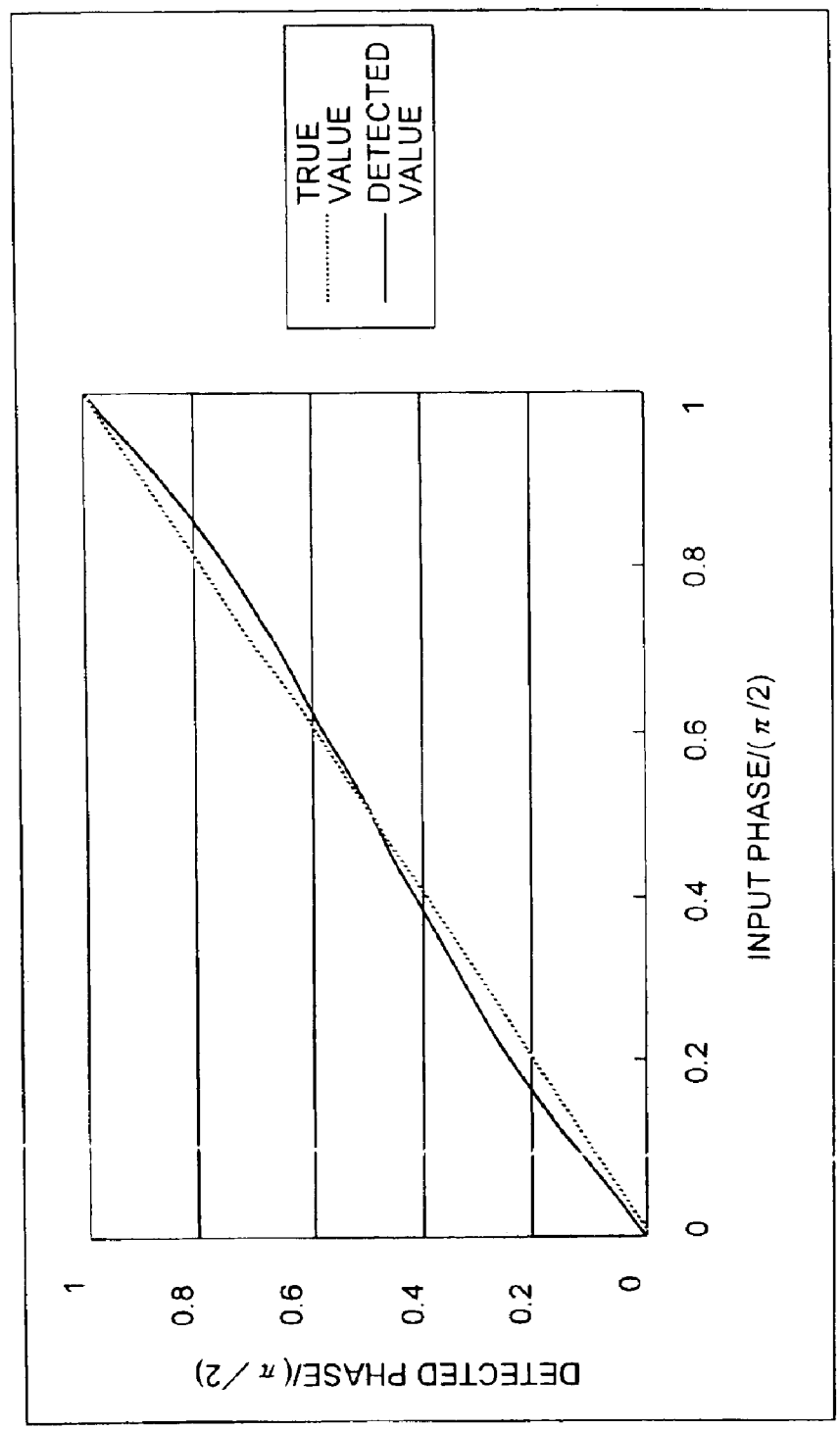
FIG. 33 shows a relationship between the phase of the input signal to the conventional phase detecting circuit and the detected phase.
Figure 34:
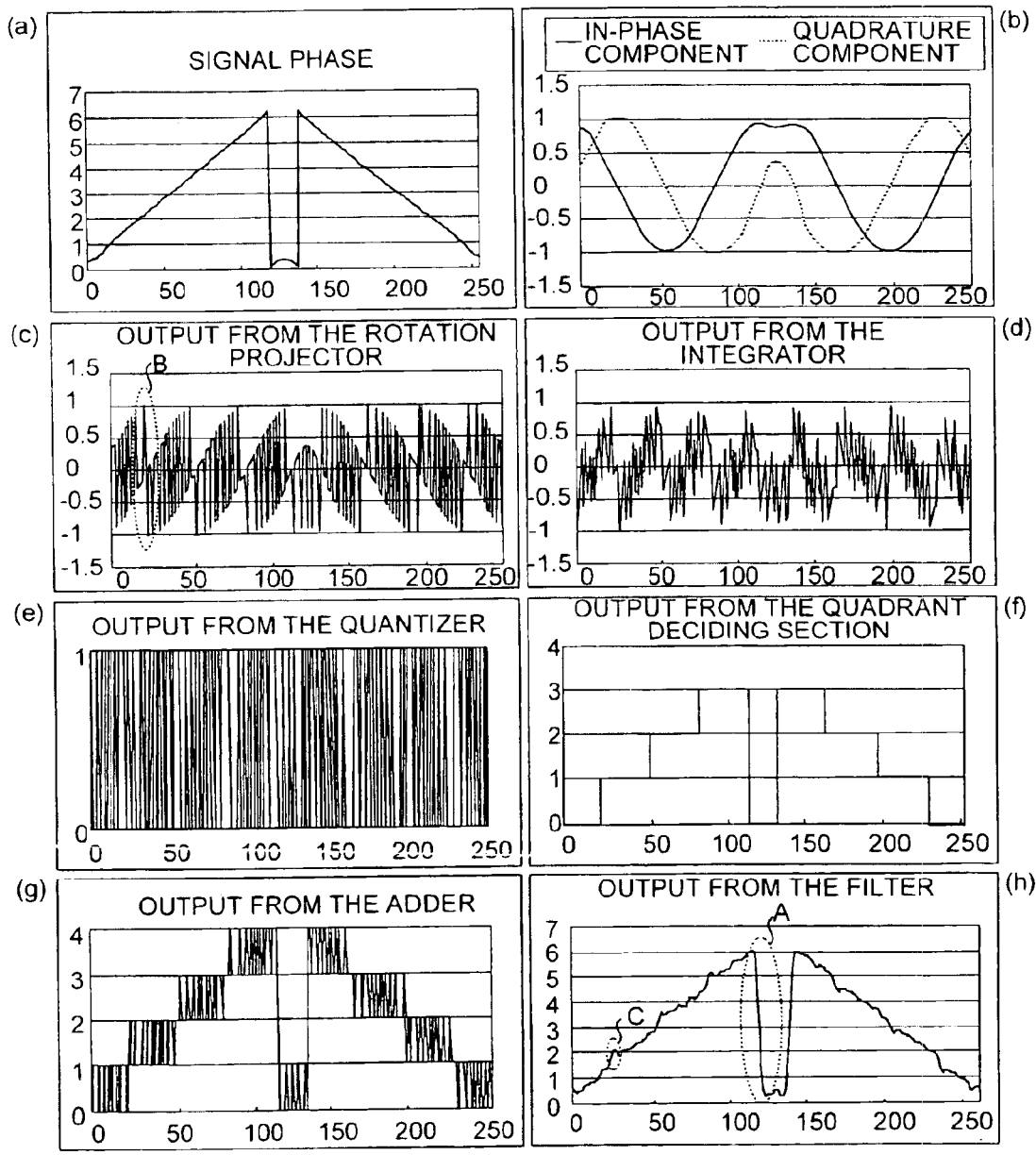
FIG. 34 shows waveforms of output signals from the sections of the conventional phase detecting circuit obtained based on a simulation carried out by the computer.

In the first to the fifth embodiments, the phase detecting circuit includes a first-order delta sigma modulator. In the sixth embodiment, the phase detecting circuit includes at least a second-order delta sigma modulator. FIG. 20 shows a structure of the phase detecting circuit according to a sixth embodiment of the present invention. In FIG. 20, a reference numeral 6 denotes an adder, and 7 denotes an integrator. In FIG. 20, the sections having the same structures as those in the first to the third embodiments are attached with like reference numerals, and their explanation is omitted. In the present embodiment, the quadrant deciding section 101, the rotation projector 4, the integrator 103, the adder 6, the integrator 7, the one-bit quantizer 5, the delay device 105, and the adder 1 constitute the delta sigma modulator. The structure shown in FIG. 20 has the adder 6 and the integrator 7 added to the structure (FIG. 4) according to the fourth embodiment, for convenience of explanation. However, the structure of the present embodiment is not limited to this structure. It is also possible to apply the adder 6 and the integrator 7 to the structure (FIG. 1) according to the first embodiment, or to the conventional structure (FIG. 30).

The operation of the phase detecting circuit according to the sixth embodiment is explained next. The sections attached with the same reference numerals as those in the phase detecting circuits according to the first to the fifth embodiments carry out similar operations respectively.

The adder 6 adds the output from the rotation projector 4 and the output from the integrator 103, and outputs the result of the addition to the integrator 7. The one bit quantizer 5 quantizes the output (integration result) from the integrator 7, and outputs 0 or 1.

According to the present embodiment, the phase detecting circuit includes at least the second-order delta sigma modulator. Based on this structure, the power spectrum of quantization noise becomes small at the low-frequency side and becomes large at the high-frequency side. Therefore, by removing the high-frequency noise with the low-pass filter 2, it becomes possible to substantially improve the signal-to-noise ratio, as compared with the phase detecting circuit that comprises the first-order delta sigma modulator like in the first to the fifth embodiments.

While the phase detecting circuit according to the present embodiment includes at least the second-order delta sigma modulator for convenience of explanation, the structure is not limited to this, and the phase detecting circuit may be composed of at least the third-order delta sigma modulator. In the present embodiment, it is also possible to use the sample holding circuit 3, like in the structure according to the third embodiment.

In the sixth embodiment, the quadrant deciding section 101 quantizes the phase of the received signal in two bits. In the seventh embodiment, the quantization resolution is N (natural number) is explained. In the present embodiment, the phase detecting circuit includes at least the second-order delta sigma modulator.

Figure 21:
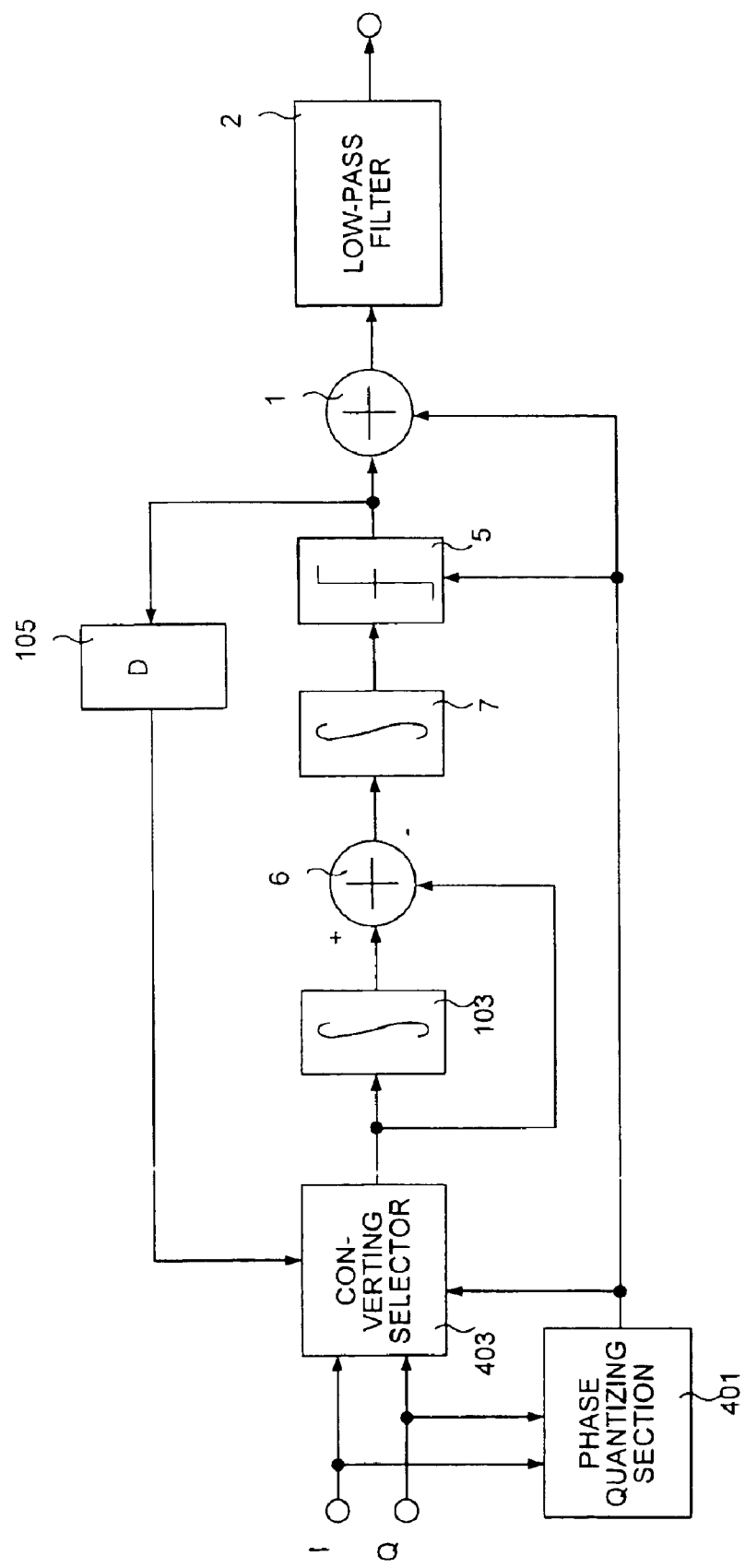
FIG. 21 shows a structure of a phase detecting circuit according to a seventh embodiment of the present invention.

FIG. 21 shows a structure of the phase detecting circuit according to a seventh embodiment of the present invention. The second-order delta sigma modulator shown in the present embodiment is based on, for example, the structure of the second-order delta sigma modulator shown on page 37 of "Over-sampling A-D conversion technique", Akira YUKAWA, Nikkei Business Publications, Inc. In FIG. 21, the sections having the same structures as those in the first to the sixth embodiments are attached with like reference numerals, and their explanation is omitted. In the present embodiment, the phase quantizing section 401, the converting selector 403, the integrator 103, the adder 6, the integrator 7, the one-bit quantizer 5, the delay device 105, and the adder 1 constitute the second-order delta sigma modulator. The structure shown in FIG. 21 has the adder 6 and the integrator 7 added to the structure (FIG. 13) according to the fifth embodiment, for convenience of explanation. However, the structure of the present embodiment is not limited to this structure. It is also possible to apply the adder 6 and the integrator 7 to the structure (FIG. 3) according to the second embodiment, or to the conventional structure (FIG. 4).

The operation of the phase detecting circuit according to the seventh embodiment is explained next. The sections attached with the same reference numerals as those in the phase detecting circuits according to the first to the sixth embodiments carry out similar operations respectively.

The adder 6 subtracts the output from the converting selector 403 from the output from the integrator 103, and adds the result of the subtraction to the integrator 7. The one-bit quantizer 5 quantizes the output (integration result) from the integrator 7, and outputs 0 or 1.

Figure 22:
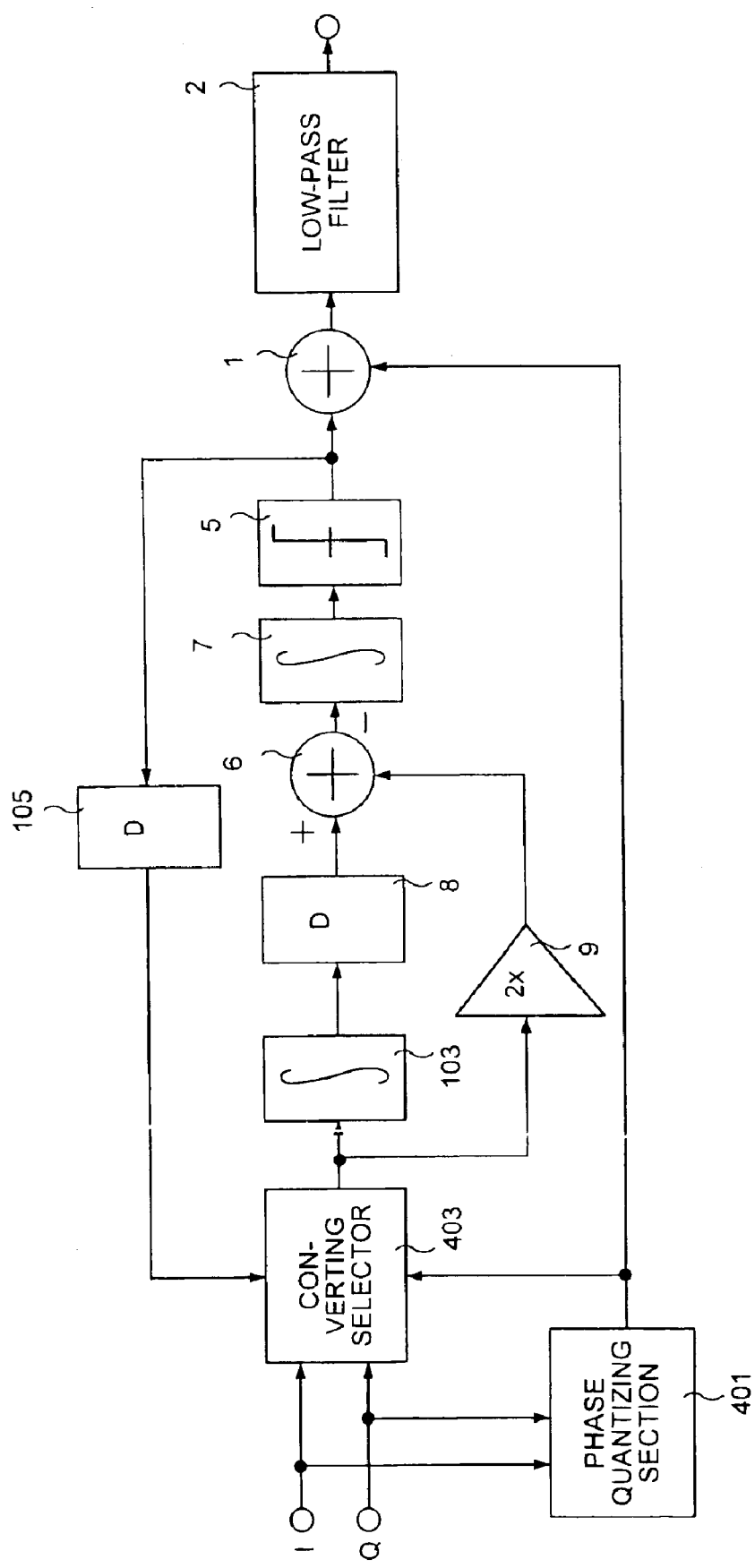
FIG. 22 shows a structure of other phase detecting circuit according to the seventh embodiment.

FIG. 22 shows a structure of a phase detecting circuit different from the phase detecting circuit shown in FIG. 21. The second-order delta sigma modulator shown in this example is based on the structure of the second-order delta sigma modulator shown on page 43 of "Over-sampling A-D conversion technique", Akira YUKAWA, Nikkei Business Publications, Inc. In FIG. 22, a reference numeral 8 denotes a delay device, and 9 denotes an amplifier. In FIG. 22, the sections having the same structures as those shown in FIG. 21 are attached with like reference numerals, and their explanation is omitted. In FIG. 22, the phase quantizing section 401, the converting selector 403, the integrator 103, the delay device 8, the amplifier 9, the adder 6, the integrator 7, the one-bit quantizer 5, the delay device 105, and the adder 1 constitute the second-order delta sigma modulator. The structure shown in FIG. 22 has the adder 6, the integrator 7, the delay device 8, and the amplifier 9 added to the structure (FIG. 13) according to the fifth embodiment, for convenience of explanation. However, the structure shown in FIG. 22 is not limited to this structure. It is also possible to apply the adder 6, the integrator 7, the delay device 8, and the amplifier 9 to the structure (FIG. 3) according to the second embodiment, or to the conventional structure (FIG. 4).

The operation of the phase detecting circuit shown in FIG. 22 is explained next. The sections attached with the same reference numerals as those in the phase detecting circuits according to the first to the sixth embodiments carry out similar operations respectively.

The delay device 8 delays the output from the integrator 103 by one cycle, and outputs the delayed result to the adder 6. The integrator 9 multiplies the output from the converting selector 403 by two, and outputs the multiplied result to the adder 6. The adder 6 subtracts the output from the amplifier 9 from the output from the delay device 8, and outputs the subtracted result to the integrator 7. The one-bit quantizer 5 quantizes the output (integration result) from the integrator 7, and outputs 0 or 1.

As explained above, when the delta sigma modulator is structured as the second-order delta sigma modulator, it is possible to shape noise such that the power spectrum density of quantization noise becomes small in the low-frequency region of the signal band, and becomes large in the high-frequency region outside the signal band. Therefore, when the subsequent low-pass filter 2 suppresses the high-frequency band, the total noise power becomes small as a result, and the signal-to-noise ratio improves.

In the present embodiment, the phase detecting circuit includes at least the second-order delta sigma modulator, as shown in FIG. 21 and FIG. 22. Based on this structure, the power spectrum density of quantization noise becomes small at the low-frequency side and becomes large at the high-frequency side. Therefore, by removing the high-frequency noise with the low-pass filter 2, it becomes possible to substantially improve the signal-to-noise ratio, as compared with the phase detecting circuit that comprises the first-order delta sigma modulator like in the first to the fifth embodiments.

While the phase detecting circuit according to the present embodiment includes at least the second-order delta sigma modulator for convenience of explanation, the structure is not limited to this, and the phase detecting circuit may be composed of at least the third-order delta sigma modulator. In the present embodiment, it is also possible to use the sample holding circuit 3, like in the structure according to the third embodiment.

Figure 23:
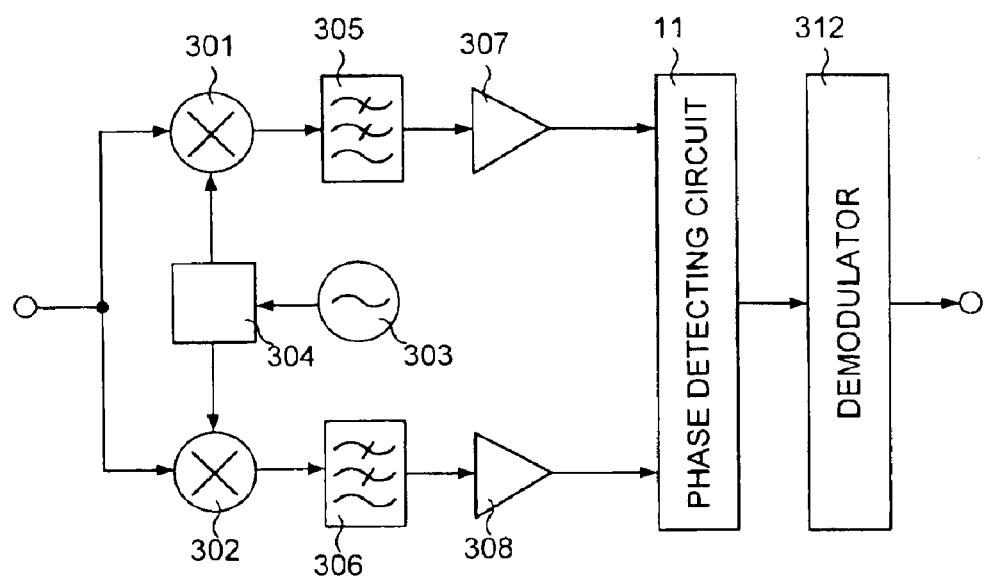
FIG. 23 shows a structure of a receiver comprising the phase detecting circuit according to an eighth embodiment of the present invention.

FIG. 23 shows a structure of a receiver comprising the phase detecting circuit (the first to the seventh embodiments) according to an eighth embodiment of the present invention. In FIG. 23, the reference numerals 301 and 302 denote the mixers, 303 denotes the local oscillator, 304 denotes the quadrature divider, 305 and 306 denote the low-pass filters, 307 and 308 denote the amplifiers, 11 denotes the phase detecting circuit according to the first to the seventh embodiments, and 312 denotes the demodulator. The phase detecting circuit 11 detects a phase from the in-phase component I and the quadrature component Q of the received baseband signal. The phase detecting circuit 11 can use any one of the structures according to the first to the seventh embodiments. The sections attached with the same reference numerals as those in the conventional phase detecting circuit carry out similar operations respectively.

As explained above, the receiver according to the present embodiment uses the phase detecting circuit that derives the quantized value of the phase from the tan θ that is the ratio of the in-phase component I to the quadrature component Q of the received baseband signal, as explained with reference to the equation (11). Therefore, it is possible to detect the phase regardless of the envelope amplitude of the received signal. As a result, the high-resolution A/D converter and the AGC that have been conventionally required are not necessary.

In the first to the fourth embodiments, the in-phase component and the quadrature component of the received baseband signal are input to the phase detecting circuit as single-end signals. The receiver shown in FIG. 23 has the structure of this example. The single-end input phase detecting circuit 11 detects the phase from the in-phase component I and the quadrature component Q of the single-end received baseband signal. Therefore, the phase quantizing section 401 and the converting selector 402 have the following structures.

Figure 24:
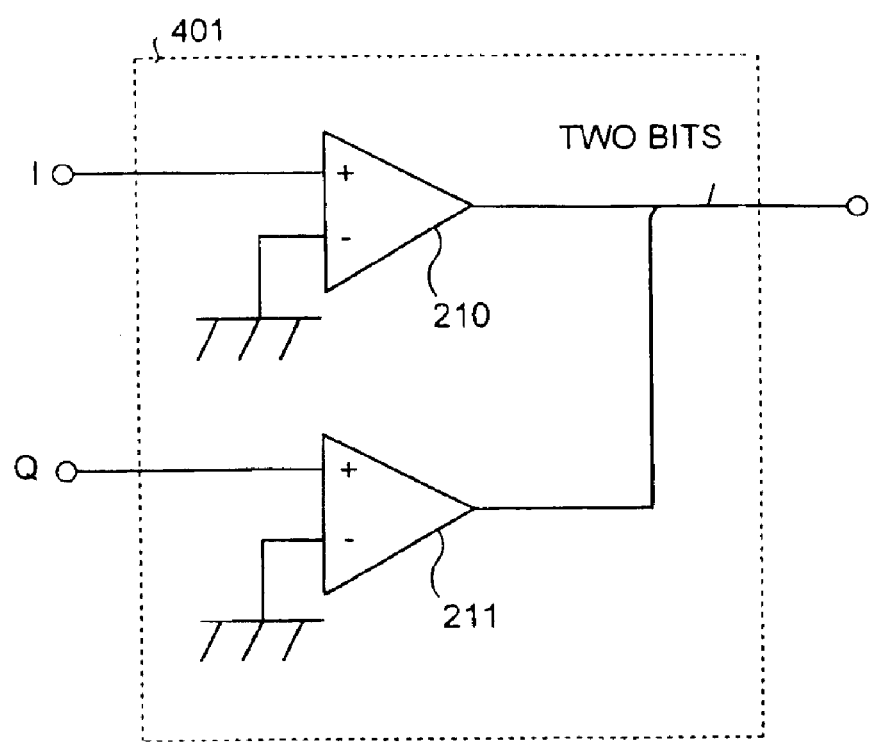
FIG. 24 shows a structure of a phase quantizing section (i.e., a quadrant deciding section) in the receiver shown in FIG. 23.
Figure 25:
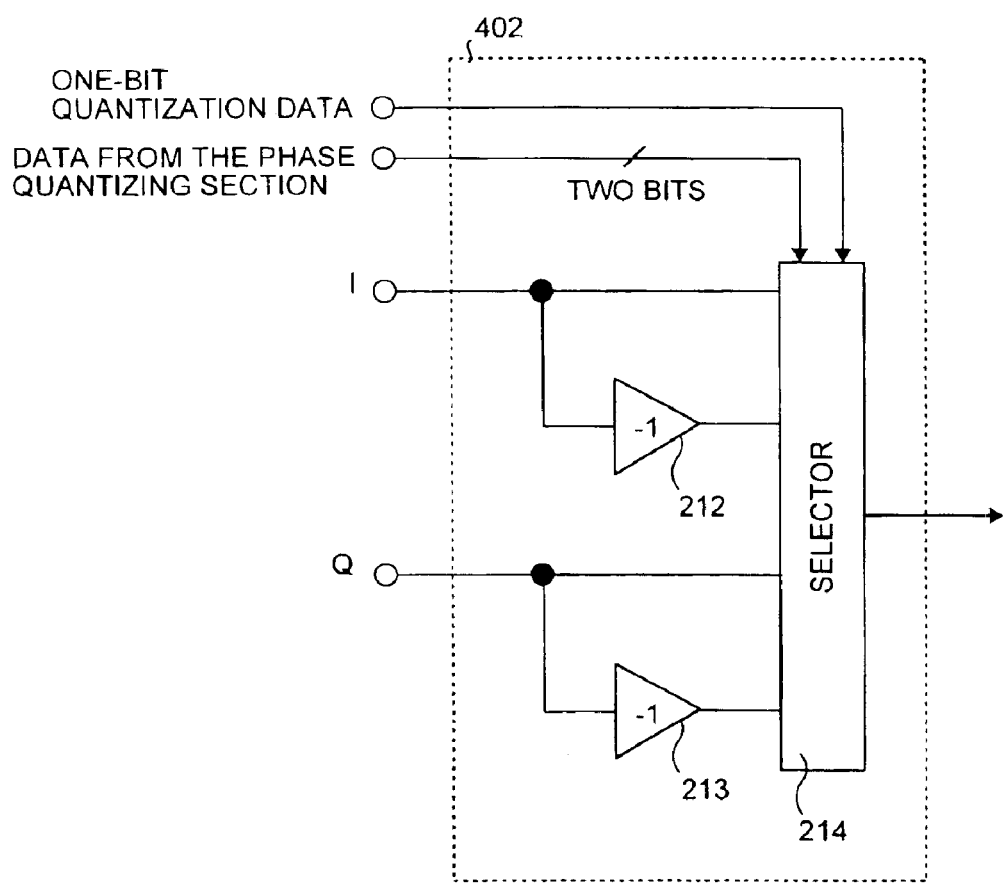
FIG. 25 shows a structure of a converting selector (i.e., a rotation projector) in the receiver shown in FIG. 23.

FIG. 24 shows the structure of the phase quantizing section (i.e., the quadrant deciding section) in the receiver shown in FIG. 23. When the quantization resolution of the phase quantizing section 401 is four (two bits), the phase quantizing section 401 includes comparators 210 and 211, as shown in FIG. 24. FIG. 25 shows the structure of the converting selector (i.e., the rotation projector) in the receiver shown in FIG. 23. The converting selector 402 includes inverting amplifiers 212 and 213, and a selector 214.

Each of the comparatos 210 and 211 compares the in-phase component I with the quadrature component Q of the received baseband signal, decides the sign, and outputs one-bit data. Each of the inverting amplifiers 212 and 213 inverts the signs of the in-phase component I and the quadrature component Q of the received baseband signal to set them to −I and −Q respectively. The inverting amplifiers 212 and 213 input the signals I, Q, −I, and −Q to the selector 214. The selector 214 selects any one of the signals based on the signs of the signals output from the phase quantizing section 401 and the one-bit quantizer 5.

However, the receiver shown in FIG. 23 has the following problem when the received baseband signal is the single-end signal. When in-phase noise or a DC offset is applied to the received baseband signal during the process from the output from the mixers 301 and 302 to the input to the phase detecting circuit 11, it is difficult for the base band low-pass filters 305 and 306 and the amplifiers 307 and 308 to remove this noise or DC offset. When the in-phase noise and the DC offset become large, it is not possible to accurately detect the phase. Further, when the gains of the inverting amplifiers 212 and 213 do not accurately become −1 but become −a (where a≠1), the input to the selector 214 becomes I, Q, −aI, or −aQ, and it is not possible to accurately detect the phase.

Figure 26:
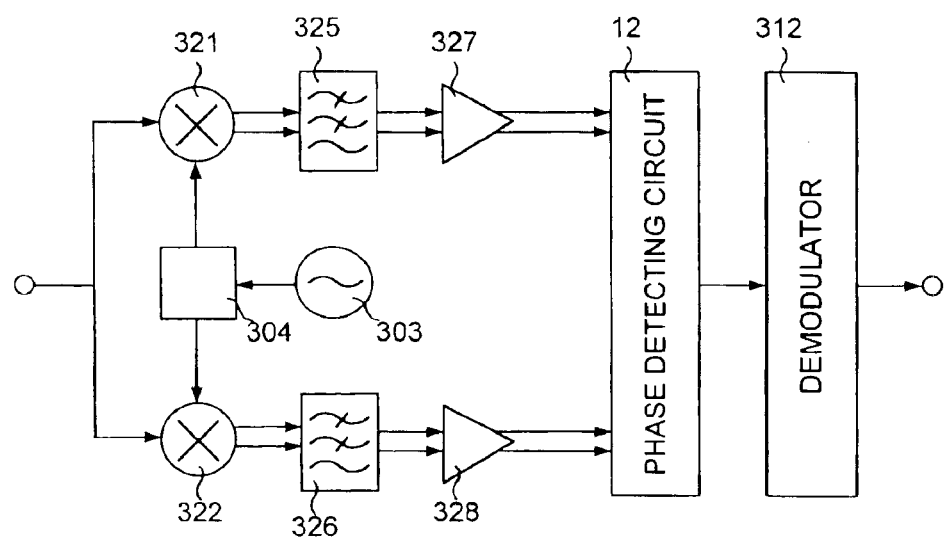
FIG. 26 shows a structure of a receiver comprising the phase detecting circuit according to a ninth embodiment of the present invention.

The present embodiment solves the above problems. FIG. 26 shows a structure of the receiver that has the phase detecting circuit according to the present invention. In FIG. 26, reference numerals 321 and 322 denote mixers of differential outputs, 325 and 326 denote low-pass filters of differential inputs and outputs, 327 and 328 denote amplifiers of differential inputs and outputs, and 12 denotes the phase detecting circuit of differential inputs. In order to detect the phase from the in-phase component I and the quadrature component Q of the single-end received baseband signal, the phase detecting circuit 12 of differential inputs has the phase quantizing section 401 and the converting selector 402 in the following structures.

Figure 27:
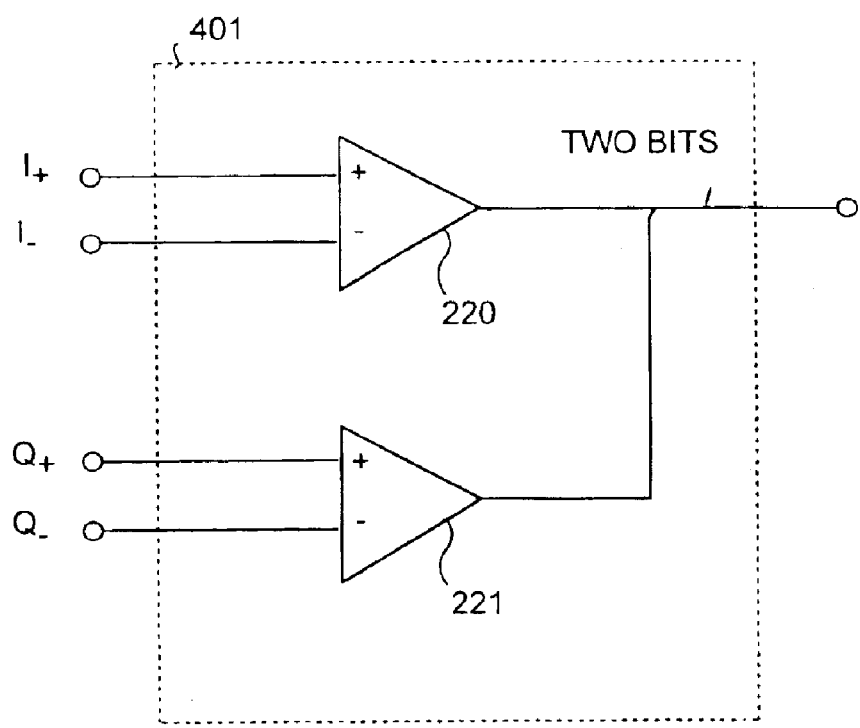
FIG. 27 shows a structure of a phase quantizing section (i.e., a quadrant deciding section) in the receiver according to the ninth embodiment.
Figure 28:
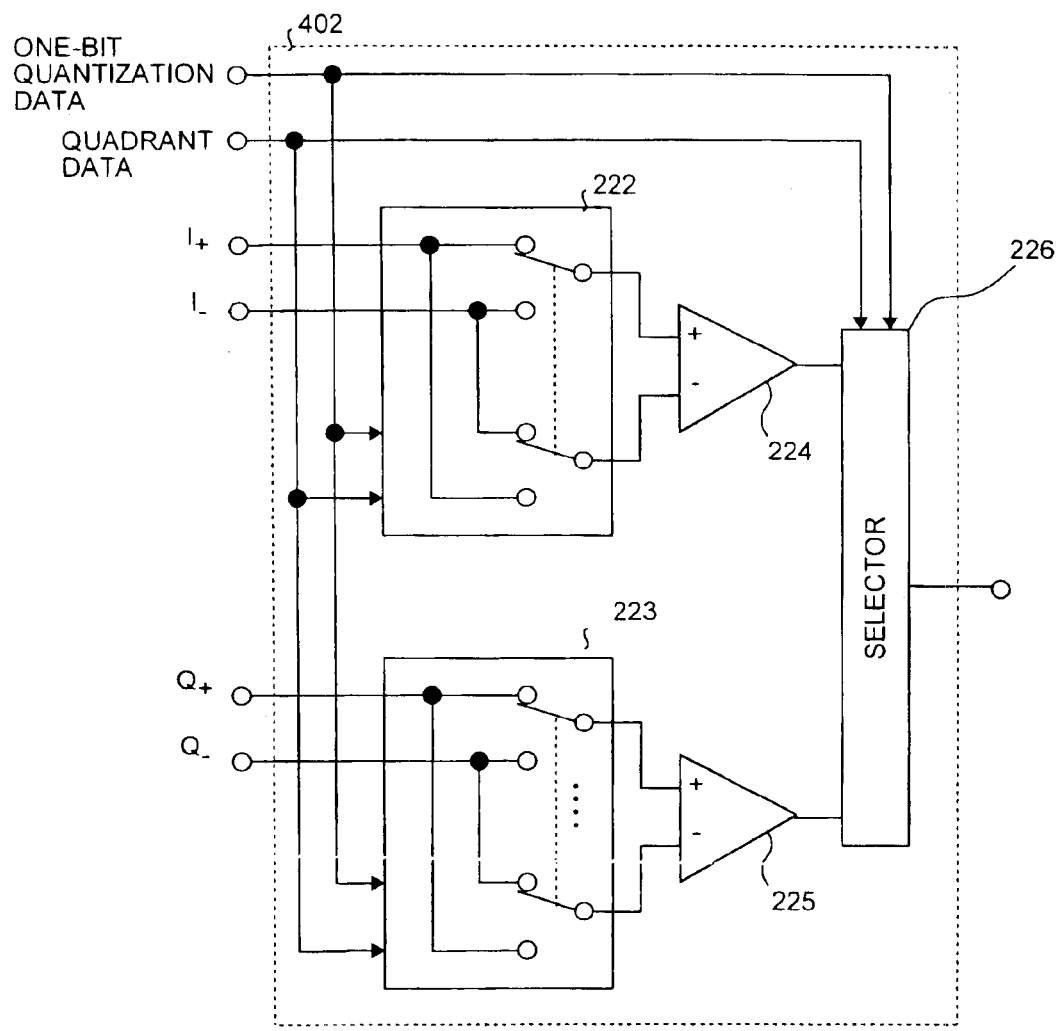
FIG. 28 shows a structure of a converting selector (i.e., a rotation projector) according to the ninth embodiment.

FIG. 27 shows the structure of the phase quantizing section (i.e., the quadrant deciding section) in the receiver according to the ninth embodiment. When the quantization resolution of the phase quantizing section 401 is four (two bits), the phase quantizing section 401 includes comparators 220 and 221, as shown in FIG. 27. FIG. 28 shows a structure of a converting selector (i.e., a rotation projector) according to the ninth embodiment. The converting selector 402 includes selectors 222, 223, and 226, and subtractors 224 and 225.

The comparator 220 decides the sign of the in-phase component I of the received baseband signal, by comparing a non-inversion signal I+ with an inversion signal I−, and outputs one-bit data. Similarly, the comparator 221 decides the sign of the quadrature component Q of the received baseband signal, by comparing a non-inversion signal Q+ with an inversion signal Q−, and outputs one-bit data. The selectors 222 and 223 select which one of the non-inversion signal (I+, Q+) and the inversion signal (I−, Q−) is to be input to the minuend side, and which one of these signals is to be input to the subtrahend side, of the subtractors 224 and 225 respectively, for the in-phase component I and the quadrature component Q of the received baseband signal respectively, based on the signs of the signals output from the phase quantizing section 401 and the one-bit quantizer 5. Therefore, the subtractor 224 outputs any one of I+−I−, and I−−I+, and the subtractor 225 outputs any one of Q+−Q−, and Q−−Q+. The selector 226 selectively outputs either the output from the subtractor 224 or the output from the subtractor 225, based on the signs of the signals output from the phase quantizing section 401 and the one-bit quantizer 5.

According to the present embodiment, the phase quantizing section 401 and the converting selector 402 consist of differential structures. Therefore, even when the in-phase noise or the DC offset appears by the same quantities in the non-inversion component and the inversion component of the received baseband signal, it is possible to detect the accurate phase by mutually canceling the noise or the offset. There occurs no problem in the precision of the gain of the inverting amplifiers.

While the operations of the phase quantizing section 401 and the converting selector 402 according to the present embodiment are explained above, the structure is not limited to this. It is also possible to obtain similar effects based on the combination of the phase quantizing section 401 and the converting selector 403, and the combination of the quadrant deciding section 101 and the rotation projector 102, respectively.

Figure 29:
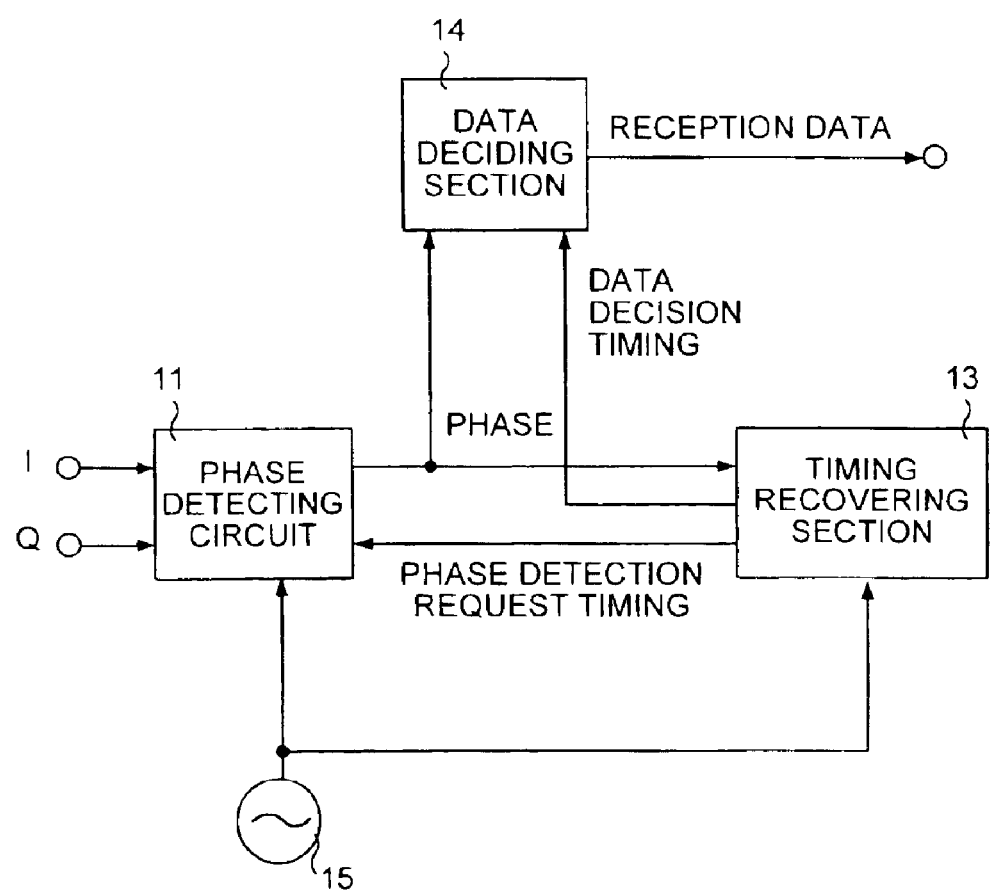
FIG. 29 shows a structure of a demodulator within the receiver according to a tenth embodiment of the present invention.

FIG. 29 shows a structure of the demodulator 312 within the receiver shown in FIG. 23. In FIG. 29, a reference numeral 13 denotes a timing recovering section, 14 denotes a data deciding section, and 15 denotes an oscillator. In the present embodiment, FIG. 29 particularly shows the structure of the phase detecting circuit 11 and the demodulator 312 included in the digital frequency modulation (FSK) or the phase modulation (PSK) receiver that comprises the phase detecting circuit according to the first to the seventh embodiments.

As explained above, the receiver usually detects the frequency or the phase of the received signal at intervals of ⅛ or 1/16 of the symbol clock, and finds a suitable data decision timing from among these frequencies or phases. In the demodulator 312 shown in FIG. 29, the timing recovering section 13 receives the clock that is 16 times the symbol clock oscillated by the oscillator 15, and the phase information of the received signal output from the phase detecting circuit 11, and searches the phase of the received signal for the data decision timing with the resolution of 1/16 of the symbol clock.

The timing recovering section 13 outputs a phase detection request timing signal to the phase detecting circuit 11. This phase detection request timing signal is expressed in the values from 0 to 15, for example. The timing recovering section 13 outputs the values from 0 to 15 for each clock of 16 times the symbol clock, until when the data decision timing is found after starting the signal reception. After the data decision timing is found, the timing recovering section 13 outputs the value of 0 at each one clock of the symbol clock, when the phase of the clock of 16 times the symbol clock is 0.

The phase detecting circuit 11 makes the adder 206, the comparing and deciding section 204, the multipliers 202-1 to 202-k, and the data converters 205-1 to 205-k operate, at only the phase detection request timing instructed by the timing recovering section 13.

As explained above, the receiver according to the present embodiment makes the low-pass filter 2 within the phase detecting circuit 11 operate, at only the phase detection request timing instructed by the timing recovering section 13. Therefore, it is possible to decrease power consumption.

While the operation of the phase detecting circuit 11 shown in FIG. 23 is explained as one example in the present embodiment, the phase detecting circuit is not limited to this, and it is also possible to obtain similar effects from the phase detecting circuit 12 shown in FIG. 26.

According to the present invention, the adding unit executes the addition modulo the quantized value of the phase $2\pi$. When the outputs from the shift registers to be executed include the phase data that cross over the quantized value of $2\pi$, the low-pass filter unit executes the processing by converting the range 0 to $2\pi$ of the phase data to the range $\pi$ to $37\pi$, and thereafter returns the range of the phase data to 0 to $2\pi$. Based on this arrangement, it is possible to obtain the accurate result of averaging the phase data. Therefore, there is an effect that it is possible to realize accurate phase detection.

According to the next invention, the second quantizing unit quantizes the output from the integrating unit by deciding the sign of this output based on the decided domain to which the received signal belongs. Further, the converting and selecting unit combines different output patterns for each domain, and outputs the result. Based on this arrangement, there is an effect that the change in the output from the converting and selecting unit becomes small, and the phase detection value becomes more accurate.

According to the next invention, the first quantizing unit, the converting and selecting unit, the integrating unit, the second quantizing unit, the delay unit, and the adding unit constitute the delta sigma modulator. Therefore, there is an effect that the low-pass filter unit can obtain the accurate result of averaging the phase data.

According to the next invention, the phase detecting circuit includes at least the second-order delta sigma modulator. Based on this structure, the power spectrum of quantization noise becomes small at the low-frequency side and becomes large at the high-frequency side. Therefore, there is an effect that by removing the high-frequency noise with the low-pass filter unit, it becomes possible to substantially improve the signal-to-noise ratio, as compared with the phase detecting circuit that comprises the first-order delta sigma modulator.

According to the next invention, sample holding circuit is provided. Therefore, during the operation of the delta sigma modulator, the output from the converting and selecting unit becomes constant. As a result, there is an effect that it is possible obtain the more accurate phase detection value.

According to the next invention, the adding unit executes the addition modulo the phase $2\pi$. When the outputs from the shift registers to be executed include the phase data that cross over $2\pi$, the low-pass filter unit executes the processing by converting the range 0 to $2\pi$ of the phase data to the range $\pi$ to $3\pi$, and thereafter returns the range of the phase data to 0 to $2\pi$. Based on this arrangement, it is possible to obtain the accurate result of averaging the phase data. Therefore, there is an effect that it is possible to realize accurate phase detection.

According to the next invention, the quadrant deciding unit, the rotation projecting unit, the integrating unit, the quantizing unit, the delay unit, and the adding unit constitute the delta sigma modulator. Therefore, there is an effect that the low-pass filter unit can obtain the accurate result of averaging the phase data.

According to the next invention, the quantizing unit quantizes the output from the integrating unit by deciding the sign of this output based on the decided quadrant to which the received signal belongs. In other words, the phase detecting circuit combines different output patterns for each quadrant, and outputs the result. Based on this arrangement, there is an effect that the change in the output from the rotation projecting unit becomes small, and the phase detection value becomes more accurate.

According to the next invention, the phase detecting circuit includes at least the second-order delta sigma modulator. Based on this structure, the power spectrum of quantization noise becomes small at the low-frequency side and becomes large at the high-frequency side. Therefore, there is an effect that by removing the high-frequency noise with the low-pass filter unit, it becomes possible to substantially improve the signal-to-noise ratio, as compared with the phase detecting circuit that comprises the first-order delta sigma modulator According to the next invention, during the operation of the delta sigma modulator, the output from the rotation projecting unit becomes constant. Therefore, there is an effect that it is possible obtain the more accurate phase detection value.

According to the next invention, the phase detecting circuit that quantizes the ratio of the in-phase component I to the quadrature component Q of the received baseband signal, is used. Therefore, there is an effect that the high-resolution A/D converter and the AGC that have been conventionally required are not necessary. Further, there is an effect that based on the use of the phase detecting circuit that can achieve accurate phase detection, it is possible to substantially improve the distortion rate characteristic and the reception bit error characteristic.

According to the next invention, the second quantizing unit quantizes the output from the integrating unit by deciding the sign of this output based on the decided quadrant to which the received signal belongs. In other words, the phase detecting circuit combines different output patterns for each quadrant, and outputs the result. Based on this arrangement, there is an effect that the change in the output from the rotation projecting unit becomes small, and the phase detection value becomes more accurate.

According to the next invention, the first quantizing unit and the converting and selecting unit consist of differential structures. Therefore, there is an effect that even when the in-phase noise or the DC offset appears by the same quantities in the non-inversion component and the inversion component of the received baseband signal, it is possible to achieve accurate phase detection by mutually canceling the noise or the offset.

According to the next invention, the phase detecting circuit that quantizes the ratio of the in-phase component I to the quadrature component Q of the received baseband signal, is used. Therefore, there is an effect that the high-resolution A/D converter and the AGC that have been conventionally required are not necessary. Further, there is an effect that based on the use of the phase detecting circuit that can achieve accurate phase detection, it is possible to substantially improve the distortion rate characteristic and the reception bit error characteristic.

According to the next invention, the quantizing unit quantizes the output from the integrating unit by deciding the sign of this output based on the decided quadrant to which the received signal belongs. In other words, the phase detecting circuit combines different output patterns for each quadrant, and outputs the result. Based on this arrangement, there is an effect that the change in the output from the rotation projecting unit becomes small, and the phase detection value becomes more accurate.

According to the next invention, the quadrant deciding unit and the rotation projecting unit consist of differential structures. Therefore, there is an effect that even when the in-phase noise or the DC offset appears by the same quantities in the non-inversion component and the inversion component of the received baseband signal, it is possible to achieve accurate phase detection by mutually canceling the noise or the offset.

According to the next invention, the phase detecting circuit includes at least the second-order delta sigma modulator that has stages of integrators. Based on this structure, the power spectrum of quantization noise becomes small at the low-frequency side and becomes large at the high-frequency side. Therefore, there is an effect that by removing the high-frequency noise with the low-pass filter unit, it becomes possible to substantially improve the signal-to-noise ratio, as compared with the phase detecting circuit that comprises the first-order delta sigma modulator.

According to the next invention, the low-pass filter unit within the phase detecting circuit is operated at only the phase detection request timing instructed by the timing recovering unit. Therefore, there is an effect that it is possible to substantially decrease power consumption.

According to the next invention, during the operation of the delta sigma modulator, the output from the rotation projecting unit or the converting and selecting unit becomes constant. Therefore, there is an effect that it is possible to obtain the more accurate phase detection value.

INDUSTRIAL APPLICABILITY

As explained above, the phase detecting circuit and the receiver according to the present invention are suitable for detecting the phase of the FSK signal or the PSK signal in digital mobile communications.

What is claimed is:

1. A phase detecting circuit comprising:
   a first quantizing unit that quantizes a phase of a received baseband signal;
   a converting and selecting unit that linearly converts the received signal based on a predetermined rule, and selectively outputs the signal after the linear conversion;
   an integrating unit that integrates the output from the converting and selecting unit;
   a second quantizing unit that quantizes the integration result by deciding the sign of the integration result;
   a delay unit that delays the output from the second quantizing unit by a predetermined first time, and outputs the delayed signal to the converting and selecting unit;
   an adding unit that adds the output from the first quantizing unit and the output from the second quantizing unit modulo the quantized value of the phase $2\pi$; and
   a low-pass filter unit that sequentially latches phase values after the addition with internal shift registers, converts the whole data within the shift registers based on a predetermined rule when the phase values that cross over the quantized value of the phase $2\pi$ it exist in the whole data, does not carry out the conversion when the phase values that cross over the quantized value of the phase $2\pi$ do not exist, averages the phase values in this state, and outputs the phase value after smoothing quantization noise.

2. The phase detecting circuit according to claim 1, wherein the first quantizing unit, the converting and selecting unit, the integrating unit, the second quantizing unit, the delay unit, and the adding unit constitute a delta sigma modulator.

3. The phase detecting circuit according to claim 2, further comprising a sample holding circuit unit that holds the received baseband signal at a constant level during a predetermined second time, at a pre-stage of the delta sigma modulator.

4. The phase detecting circuit according to claim 2, wherein the delta sigma modulator comprises a plurality of stages of integrators.

5. The phase detecting circuit according to claim 4, further comprising a sample holding circuit unit that holds the received baseband signal at a constant level during a predetermined second time, at a pre-stage of the delta sigma modulator.

6. A phase detecting circuit comprising:
   a first quantizing unit that quantizes the phase of a received baseband signal;
   a converting and selecting unit that linearly converts the received signal based on a predetermined rule, and selectively outputs the signal after the linear conversion;
   an integrating unit that integrates the output from the converting and selecting unit;
   a second quantizing unit that quantizes the integration result by deciding the sign of the integration result based on the output from the first quantizing unit;
   a delay unit that delays the output from the second quantizing unit by a predetermined time, and outputs the delayed signal to the converting and selecting unit;
   an adding unit that adds the output from the first quantizing unit and the output from the second quantizing unit modulo the quantized value of the phase $2\pi$; and
   a low-pass filter unit that sequentially latches phase values after the addition with internal shift registers, converts the whole data within the shift registers based on a predetermined rule when the phase values that cross over the quantized value of the phase 2π exist in the whole data, does not carry out the conversion when the phase values that cross over the quantized value of the phase 2π do not exist, averages the phase values in this state, and outputs the phase value after smoothing quantization noise.

7. The phase detecting circuit according to claim 6, wherein the first quantizing unit, the converting and selecting unit, the integrating unit, the second quantizing unit, the delay unit, and the adding unit constitute a delta sigma modulator.

8. The phase detecting circuit according to claim 7, further comprising a sample holding circuit unit that holds the received baseband signal at a constant level during a predetermined second time, at a pre-stage of the delta sigma modulator.

9. The phase detecting circuit according to claim 7, wherein the delta sigma modulator comprises stages of integrators.

10. The phase detecting circuit according to claim 9, further comprising a sample holding circuit unit that holds the received baseband signal at a constant level during a predetermined second time, at a pre-stage of the delta sigma modulator.

11. A receiver comprising:
a first quantizing unit that quantizes the phase of a received baseband signal;
a converting and selecting unit that linearly converts the received baseband signal based on a predetermined rule, and selectively outputs the signal after the linear conversion;
an integrating unit that integrates the output from the converting and selecting unit;
a second quantizing unit that quantizes the integration result by deciding the sign of the integration result;
a delay unit that delays the output from the second quantizing unit by a predetermined first time, and outputs the delayed signal to the converting and selecting unit;
an adding unit that adds the output from the first quantizing unit and the output from the second quantizing unit modulo the quantized value of the phase 2π;
a low-pass filter unit that sequentially latches phase values after the addition with internal shift registers, converts the whole data within the shift registers based on a predetermined rule when the phase values that cross over the quantized value of the phase 2π exist in the whole data, does not carry out the conversion when the phase values that cross over the quantized value of the phase 2π do not exist, averages the phase values in this state, and outputs the phase value after smoothing quantization noise; and
a demodulator that demodulates the reception data based on the phase value,
wherein the first quantizing unit, the converting and selecting unit, the integrating unit, the second quantizing unit, the delay unit, and the adding unit constitute a delta sigma modulator.

12. The receiver according claim 11, wherein differential inputs are applied to the first quantizing unit and the converting and selecting unit.

13. The receiver according claim 11, wherein the delta sigma modulator is in the M-order structure.

14. The receiver according claim 11, wherein the demodulator comprises:
a timing recovering unit that receives a clock that is L times the symbol clock generated by an oscillator, and the phase value, searches the phase value for a data decision timing with the resolution of 1/L of the symbol clock, and generates a phase detection request timing to operate the low-pass filter unit; and
a data deciding unit that decides reception data based on the phase value and the data decision timing, wherein the low-pass filter unit operates at the phase detection request timing.

15. The receiver according to claim 11, further comprising a sample holding circuit unit that holds the amplified received baseband signal at a constant level during a predetermined second time, at a pre-stage of the delta sigma modulator.

16. A receiver comprising:
a first quantizing unit that quantizes the phase of a received baseband signal;
a converting and selecting unit that linearly converts the received baseband signal based on a predetermined rule, and selectively outputs the signal after the linear conversion;
an integrating unit that integrates the output from the converting and selecting unit;
a second quantizing unit that quantizes the integration result by deciding the sign of the integration result based on the output from the first quantizing unit;
a delay unit that delays the output from the second quantizing unit by a predetermined time, and outputs the delayed signal to the convening and selecting unit;
an adding unit that adds the output from the first quantizing unit and the output from the second quantizing unit modulo the quantized value of the phase 2π;
a low-pass filter unit that sequentially latches phase values after the addition with internal shift registers, converts the whole data within the shift registers based on a predetermined rule when the phase values that cross over the quantized value of the phase 2π exist in the whole data, does not carry out the conversion when the phase values that cross over the quantized value of the phase 2π do not exist, averages the phase values in this state, and outputs the phase value after smoothing quantization noise; and
a demodulator that demodulates the reception data based on the phase value,
wherein the first quantizing unit, the converting and selecting unit, the integrating unit, the second quantizing unit, the delay unit, and the adding unit constitute a delta sigma modulator.

17. The receiver according claim 16, wherein differential inputs are applied to the first quantizing unit and the converting and selecting unit.

18. The receiver according claim 16, wherein the delta sigma modulator is in the M-order structure.

19. The receiver according claim 16, wherein the demodulator comprises:
a timing recovering unit that receives a clock that is L times the symbol clock generated by an oscillator, and the phase value, searches the phase value for a data decision timing with the resolution of 1/L of the symbol clock, and generates a phase detection request timing to operate the low-pass filter unit; and
a data deciding unit that decides reception data based on the phase value and the data decision timing, wherein the low-pass filter unit operates at the phase detection request timing.

20. The receiver according to claim 16, further comprising a sample holding circuit unit that holds the amplified received baseband signal at a constant level during a predetermined second time, at a pre-stage of the delta sigma modulator.

* * * * *